(12) United States Patent
Shaw et al.

(10) Patent No.: US 10,469,286 B2
(45) Date of Patent: Nov. 5, 2019

(54) METHODS, SYSTEMS, AND DEVICES FOR MANAGING CLIENT DEVICES USING A VIRTUAL ANCHOR MANAGER

(71) Applicant: AT&T INTELLECTUAL PROPERTY I, L.P., Atlanta, GA (US)

(72) Inventors: Venson Shaw, Kirkland, WA (US); Sangar Dowlatkhah, Alpharetta, GA (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 201 days.

(21) Appl. No.: 15/450,642

(22) Filed: Mar. 6, 2017

(65) Prior Publication Data

US 2018/0254920 A1  Sep. 6, 2018

(51) Int. Cl.

| G06F 15/16 | (2006.01) |
|---|---|
| H04L 12/46 | (2006.01) |
| H04L 29/06 | (2006.01) |
| H04W 4/70 | (2018.01) |
| H04W 84/12 | (2009.01) |

(Continued)

(52) U.S. Cl.
CPC ......... *H04L 12/4641* (2013.01); *H04L 29/06* (2013.01); *H04W 4/70* (2018.02); *H04L 61/157* (2013.01); *H04L 61/308* (2013.01); *H04L 61/3085* (2013.01); *H04W 4/80* (2018.02); *H04W 84/12* (2013.01)

(58) Field of Classification Search
CPC .......................... H04L 29/06; H04L 29/08072
USPC ................... 709/203, 220, 224, 228
See application file for complete search history.

(56) References Cited

U.S. PATENT DOCUMENTS

| 4,285,469 A | 8/1981 | Huang |
|---|---|---|
| 5,671,253 A | 9/1997 | Stewart |
| 5,970,408 A | 10/1999 | Carlsson et al. |

(Continued)

FOREIGN PATENT DOCUMENTS

| CN | 102045896 A | 5/2011 |
|---|---|---|
| CN | 105227385 A | 1/2016 |

(Continued)

OTHER PUBLICATIONS

"Cell Site on Light Trucks", 2007, 1 page.

(Continued)

*Primary Examiner* — Khanh Q Dinh
(74) *Attorney, Agent, or Firm* — Guntin & Gust, PLC; Ralph Trementozzi

(57) ABSTRACT

Aspects of the subject disclosure may include, for example, embodiments of a virtual anchor manager continuously connecting to a control plane of a wireless communication network. Further embodiments include receiving control information across the control plane indicating that client data is to be received on the user plane of the wireless communication network for a client device. Additional embodiments include accessing a first protocol stack via a network node according to the control information. Also, embodiments include receiving the client data for the client device over the user plane using the first protocol stack. The client device includes a thin client function. Embodiments include providing the client data for the client device over a premises communication network. Other embodiments are disclosed.

20 Claims, 15 Drawing Sheets

(51) Int. Cl.
*H04W 4/80* (2018.01)
*H04L 29/12* (2006.01)

(56) References Cited

U.S. PATENT DOCUMENTS

| | | | |
|---|---|---|---|
| 6,246,883 B1 | 6/2001 | Lee | |
| 6,542,500 B1 | 4/2003 | Gerszberg et al. | |
| 6,795,686 B2 | 9/2004 | Master et al. | |
| 6,873,620 B1 | 3/2005 | Coveley et al. | |
| 7,167,923 B2 | 1/2007 | Lo et al. | |
| 7,206,294 B2 | 4/2007 | Garahi et al. | |
| 7,532,640 B2 | 5/2009 | Kelly et al. | |
| 7,660,583 B2 | 2/2010 | Pekonen et al. | |
| 7,787,414 B2 | 8/2010 | Le Faucheur et al. | |
| 8,145,208 B2 | 3/2012 | Chari et al. | |
| 8,150,421 B2* | 4/2012 | Ward | H04W 64/00 455/404.2 |
| 8,234,650 B1 | 7/2012 | Eppstein et al. | |
| 8,385,977 B2 | 2/2013 | Fein et al. | |
| 8,593,968 B2 | 11/2013 | Santiago et al. | |
| 8,621,058 B2 | 12/2013 | Eswaran et al. | |
| 8,676,219 B2 | 3/2014 | Lennvall et al. | |
| 8,868,069 B2 | 10/2014 | Bennett et al. | |
| 9,078,284 B2 | 7/2015 | Richardson | |
| 9,119,016 B2 | 8/2015 | Durand et al. | |
| 9,185,545 B2 | 11/2015 | Yeoum et al. | |
| 9,225,587 B2 | 12/2015 | Zhang et al. | |
| 9,225,652 B2 | 12/2015 | Li et al. | |
| 9,245,246 B2 | 1/2016 | Breitgand et al. | |
| 9,298,515 B2 | 3/2016 | McMurry et al. | |
| 9,301,333 B2 | 3/2016 | Choi et al. | |
| 9,305,301 B2 | 4/2016 | Paul et al. | |
| 9,306,909 B2 | 4/2016 | Koponen et al. | |
| 9,311,108 B2 | 4/2016 | Cummings | |
| 9,330,156 B2 | 5/2016 | Satapathy | |
| 9,369,390 B2 | 6/2016 | Bantukul et al. | |
| 9,391,897 B2 | 7/2016 | Sparks et al. | |
| 9,392,471 B1 | 7/2016 | Thomas et al. | |
| 9,401,962 B2 | 7/2016 | Parker et al. | |
| 9,407,542 B2 | 8/2016 | Vasseur | |
| 9,436,443 B2 | 9/2016 | Chiosi et al. | |
| 9,445,341 B2 | 9/2016 | Spinelli et al. | |
| 9,450,817 B1 | 9/2016 | Bahadur et al. | |
| 9,450,823 B2 | 9/2016 | Arora et al. | |
| 9,461,729 B2 | 10/2016 | Djukic et al. | |
| 9,497,572 B2 | 11/2016 | Britt et al. | |
| 9,503,969 B1 | 11/2016 | Zakaria et al. | |
| 9,516,597 B2* | 12/2016 | Tabatabaei Yazdi | H04W 76/27 |
| 9,544,120 B2 | 1/2017 | Scholten et al. | |
| 9,559,980 B2 | 1/2017 | Li et al. | |
| 9,565,074 B2 | 2/2017 | Lehane et al. | |
| 9,602,422 B2 | 3/2017 | Padmanabhan et al. | |
| 9,860,288 B2* | 1/2018 | Lockhart | G06F 17/30017 |
| 9,961,016 B2 | 5/2018 | Ringland et al. | |
| 10,039,006 B2 | 7/2018 | Shaw et al. | |
| 10,103,991 B2* | 10/2018 | Agarwal | H04W 4/02 |
| 2003/0145106 A1 | 7/2003 | Brown et al. | |
| 2003/0152034 A1 | 8/2003 | Zhang et al. | |
| 2004/0071086 A1 | 4/2004 | Haumont et al. | |
| 2004/0103308 A1 | 5/2004 | Paller et al. | |
| 2007/0022191 A1 | 1/2007 | Miao | |
| 2007/0140269 A1 | 6/2007 | Donnelli et al. | |
| 2007/0259661 A1 | 11/2007 | Hurtta et al. | |
| 2007/0294668 A1 | 12/2007 | Mohindra et al. | |
| 2008/0285492 A1 | 11/2008 | Vesterinen et al. | |
| 2009/0265542 A1* | 10/2009 | Khetawat | H04L 63/104 713/151 |
| 2009/0296827 A1 | 12/2009 | Karaoguz et al. | |
| 2010/0017506 A1 | 1/2010 | Fadell | |
| 2010/0234071 A1 | 9/2010 | Shabtay et al. | |
| 2011/0116499 A1 | 5/2011 | Lim et al. | |
| 2011/0182227 A1 | 7/2011 | Rune et al. | |
| 2011/0238840 A1 | 9/2011 | Shi et al. | |
| 2011/0282931 A1 | 11/2011 | Chen et al. | |
| 2011/0292896 A1 | 12/2011 | Yeuom et al. | |
| 2012/0087279 A1* | 4/2012 | Rinne | H04W 48/18 370/254 |
| 2012/0140749 A1 | 6/2012 | Caldwell et al. | |
| 2012/0184266 A1 | 7/2012 | Faccin et al. | |
| 2012/0236716 A1 | 9/2012 | Anbazhagan et al. | |
| 2012/0303828 A1 | 11/2012 | Young et al. | |
| 2013/0010756 A1 | 1/2013 | Liang et al. | |
| 2013/0072199 A1 | 3/2013 | Miyagawa et al. | |
| 2013/0337872 A1 | 12/2013 | Fertl et al. | |
| 2014/0023044 A1 | 1/2014 | Sjölinder et al. | |
| 2014/0059194 A1 | 2/2014 | Robb et al. | |
| 2014/0070892 A1 | 3/2014 | Matsuoka et al. | |
| 2014/0143378 A1* | 5/2014 | Bhupalam | H04L 65/4084 709/217 |
| 2014/0254382 A1 | 9/2014 | Randriamasy et al. | |
| 2014/0259012 A1 | 9/2014 | Nandlall et al. | |
| 2014/0269435 A1 | 9/2014 | McConnell et al. | |
| 2014/0307556 A1 | 10/2014 | Zhang et al. | |
| 2014/0349611 A1 | 11/2014 | Kant et al. | |
| 2014/0376454 A1 | 12/2014 | Boudreau et al. | |
| 2015/0109967 A1 | 4/2015 | Hogan et al. | |
| 2015/0113100 A1 | 4/2015 | Tweedale et al. | |
| 2015/0139238 A1 | 5/2015 | Pourzandi et al. | |
| 2015/0146716 A1 | 5/2015 | Olivier et al. | |
| 2015/0172115 A1 | 6/2015 | Nguyen et al. | |
| 2015/0257012 A1 | 9/2015 | Zhang | |
| 2015/0257038 A1 | 9/2015 | Scherzer | |
| 2015/0295833 A1 | 10/2015 | Mizukoshi et al. | |
| 2015/0296459 A1* | 10/2015 | Tabatabaei Yazdi | H04W 76/27 370/311 |
| 2015/0319078 A1 | 11/2015 | Lee et al. | |
| 2015/0341187 A1* | 11/2015 | Diwane | H04L 49/35 370/401 |
| 2015/0350102 A1 | 12/2015 | Leon-garcia et al. | |
| 2015/0378753 A1 | 12/2015 | Phillips et al. | |
| 2015/0382278 A1 | 12/2015 | Fallon et al. | |
| 2016/0014787 A1 | 1/2016 | Zhang et al. | |
| 2016/0021588 A1 | 1/2016 | Kamdar et al. | |
| 2016/0021684 A1 | 1/2016 | Lewis et al. | |
| 2016/0041427 A1* | 2/2016 | Wang | G02F 1/133555 349/96 |
| 2016/0044136 A1 | 2/2016 | Schiff et al. | |
| 2016/0073278 A1 | 3/2016 | Roessler et al. | |
| 2016/0080484 A1 | 3/2016 | Earl | |
| 2016/0088092 A1 | 3/2016 | Cardona-gonzalez et al. | |
| 2016/0094668 A1 | 3/2016 | Chang et al. | |
| 2016/0095019 A1 | 3/2016 | Cui et al. | |
| 2016/0095042 A1 | 3/2016 | Wadhwa | |
| 2016/0105821 A1 | 4/2016 | Senarath et al. | |
| 2016/0105893 A1 | 4/2016 | Senarath et al. | |
| 2016/0112335 A1 | 4/2016 | Bouanen et al. | |
| 2016/0112903 A1 | 4/2016 | Kaushik et al. | |
| 2016/0113018 A1 | 4/2016 | Li | |
| 2016/0127230 A1 | 5/2016 | Cui et al. | |
| 2016/0127239 A1 | 5/2016 | Kahn et al. | |
| 2016/0142282 A1 | 5/2016 | Guo | |
| 2016/0142427 A1 | 5/2016 | De Los Reyes et al. | |
| 2016/0149815 A1 | 5/2016 | Cotter | |
| 2016/0150421 A1 | 5/2016 | Li et al. | |
| 2016/0150448 A1 | 5/2016 | Perras et al. | |
| 2016/0156513 A1 | 6/2016 | Zhang et al. | |
| 2016/0164787 A1 | 6/2016 | Roach et al. | |
| 2016/0174191 A1 | 6/2016 | Singh et al. | |
| 2016/0182288 A1 | 6/2016 | Mäenpää | |
| 2016/0183156 A1 | 6/2016 | Chin et al. | |
| 2016/0212017 A1 | 7/2016 | Li et al. | |
| 2016/0218948 A1 | 7/2016 | Djukic | |
| 2016/0218971 A1 | 7/2016 | Basunov | |
| 2016/0219076 A1 | 7/2016 | Paczkowski et al. | |
| 2016/0226791 A1* | 8/2016 | Ramamoorthy | H04L 47/783 |
| 2016/0248860 A1 | 8/2016 | Dunbar et al. | |
| 2016/0249353 A1 | 8/2016 | Nakata et al. | |
| 2016/0262044 A1 | 9/2016 | Calin et al. | |
| 2016/0286043 A1 | 9/2016 | John et al. | |
| 2016/0294732 A1 | 10/2016 | Chou et al. | |
| 2016/0294734 A1 | 10/2016 | Jang et al. | |
| 2016/0295614 A1 | 10/2016 | Lee et al. | |

(56) References Cited

U.S. PATENT DOCUMENTS

| | | |
|---|---|---|
| 2016/0301566 A1 | 10/2016 | Ramasubramani et al. |
| 2016/0352645 A1 | 12/2016 | Senarath et al. |
| 2016/0352924 A1 | 12/2016 | Senarath et al. |
| 2016/0353268 A1 | 12/2016 | Senarath et al. |
| 2016/0353422 A1 | 12/2016 | Vrzic et al. |
| 2016/0353465 A1 | 12/2016 | Vrzic et al. |
| 2016/0359682 A1 | 12/2016 | Senarath et al. |
| 2016/0373372 A1 | 12/2016 | Gillon et al. |
| 2016/0381146 A1 | 12/2016 | Zhang et al. |
| 2016/0381528 A1 | 12/2016 | Lee et al. |
| 2016/0381662 A1 | 12/2016 | Wang et al. |
| 2017/0005390 A1 | 1/2017 | Zakaria et al. |
| 2017/0026887 A1 | 1/2017 | Sirotkin et al. |
| 2017/0034761 A1 | 2/2017 | Narayanan |
| 2017/0054595 A1 | 2/2017 | Zhang et al. |
| 2017/0064591 A1 | 3/2017 | Padfield et al. |
| 2017/0064666 A1 | 3/2017 | Zhang |
| 2017/0070892 A1 | 3/2017 | Song et al. |
| 2017/0078183 A1 | 3/2017 | Civanlar et al. |
| 2017/0079059 A1 | 3/2017 | Li et al. |
| 2017/0085493 A1 | 3/2017 | Senarath et al. |
| 2017/0086049 A1 | 3/2017 | Vrzic |
| 2017/0086118 A1 | 3/2017 | Vrzic |
| 2017/0104609 A1 | 4/2017 | McNamee et al. |
| 2017/0104688 A1 | 4/2017 | Mirahsan et al. |
| 2017/0105144 A1 | 4/2017 | Strand et al. |
| 2017/0150399 A1 | 5/2017 | Kedalagudde et al. |
| 2017/0164419 A1 | 6/2017 | Kim |
| 2017/0244598 A1 | 8/2017 | Crouse |
| 2017/0257276 A1 | 9/2017 | Chou et al. |
| 2017/0272978 A1 | 9/2017 | Giloh et al. |
| 2017/0279672 A1 | 9/2017 | Krishnan et al. |
| 2017/0300350 A1 | 10/2017 | Ferris |
| 2017/0302369 A1 | 10/2017 | Kwoczek et al. |
| 2017/0303189 A1 | 10/2017 | Hampel et al. |
| 2017/0308407 A1 | 10/2017 | Vaishnavi |
| 2017/0329639 A1 | 11/2017 | Morper et al. |
| 2017/0339567 A1 | 11/2017 | Li et al. |
| 2018/0077024 A1 | 3/2018 | Zhang |
| 2018/0084518 A1 | 3/2018 | Cattoni et al. |
| 2018/0098246 A1 | 4/2018 | Hoffmann |
| 2018/0123932 A1 | 5/2018 | Shaw et al. |
| 2018/0124254 A1 | 5/2018 | Shaw et al. |
| 2018/0124592 A1 | 5/2018 | Ye et al. |
| 2018/0139129 A1 | 5/2018 | Dowlatkhah et al. |
| 2018/0160311 A1 | 6/2018 | Shaw et al. |
| 2018/0248953 A1 | 8/2018 | Shaw et al. |
| 2018/0302316 A1 | 10/2018 | Ubaldi et al. |
| 2018/0316799 A1 | 11/2018 | Shaw et al. |
| 2018/0332476 A1 | 11/2018 | Shaw et al. |

FOREIGN PATENT DOCUMENTS

| | | |
|---|---|---|
| CN | 105516312 A | 4/2016 |
| CN | 105979542 A | 9/2016 |
| CN | 106257944 A | 12/2016 |
| JP | 5656803 B2 | 1/2015 |
| KR | 1473783 | 12/2014 |
| WO | 2000067449 | 11/2000 |
| WO | 2014071084 A2 | 5/2014 |
| WO | 2015198087 A1 | 12/2015 |
| WO | 2016051237 | 4/2016 |
| WO | 2016126238 A1 | 8/2016 |
| WO | 2016162467 A1 | 10/2016 |
| WO | 2016192639 A1 | 12/2016 |
| WO | 2017011827 A1 | 1/2017 |
| WO | 2017023196 | 2/2017 |
| WO | 2017044151 A1 | 3/2017 |
| WO | 2017044153 | 3/2017 |
| WO | 2017058067 | 4/2017 |

OTHER PUBLICATIONS

"Network Slicing", ericsson.com, Apr. 12, 2017.

"Network Slicing for 5G Networks and Services", 5G Americas™, 5gamericas.org, Nov. 2016.

"The Edge of the Cloud 5G Technology Blog", edgeofcloud.blogspot.com, TechBlogger, pen, Apr. 8, 2017.

Bor-Yaliniz, et al., "The new frontier in RAN heterogeneity: Multi-tier drone-cells", 2016, 9 pages.

Dhekne, et al., "Extending Cell Tower Coverage through Drones", 2017, 6 pages.

Gramaglia, Marco et al., "Flexible connectivity and QoE/QoS management for 5G Networks: The 5G NORMA view", Communications Workshops (ICC), 2016 IEEE International Conference on. IEEE, 2016.

McCullough, Don, "Why 5G Network Slices?", ericsson.com, Feb. 17, 2015.

Nikaein, Navid et al., "Network store: Exploring slicing in future 5g networks", Proceedings of the 10th International Workshop on Mobility in the Evolving Internet Architecture, ACM, 2015.

Open Networking Foundation, "TR-526 Applying SDN Architecture to 5G Slicing", Issue 1, Apr. 2016, 1-19.

Podleski, Lukasz et al., "Multi-domain Software Defined Network: exploring possibilities in", TNC, 2014.

Sayadi, Bessem et al., "SDN for 5G Mobile Networks: NORMA perspective", International Conference on Cognitive Radio Oriented Wireless Networks. Springer International Publishing, 2016.

Biral, Andrea et al., "The Challenges of M2M Massive Access in Wireless Cellular Networks", Department of Information Engineering of the University of Padova, Mar. 27, 2015, 1-19.

Datta, Soumya K. et al., "Smart M2M Gateway Based Architecture for M2M Device and Endpoint Management", Internet of Things (iThings), 2014 IEEE International Conference on, and Green Computing and Communications (GreenCom), IEEE and Cyber, Physical and Social Computing (CPSCom), IEEE. IEEE, 2014., 2014, 1-8.

Deak, Gabriel et al., "IoT (Internet of Things) and DFPL (Device-Free Passive Localisation) in a Disaster Management Scenario", Internet of Things (WF-IoT), 2015 IEEE 2nd World Forum on. IEEE, 2015., Aug. 2, 2012, 1-15.

Ghavimi, Fayezeh et al., "M2M Communications in 3GPP LTE/LTE-A Networks: Architectures, Service Requirements, Challenges, and Applications", IEEE Communication Surveys & Tutorials, vol. 17, No. 2, Second Quarter 2015, May 9, 2015, 525-549.

Le, Long B., "Enabling 5G Mobile Wireless Technologies", EURASIP Journal on Wireless Communications and Networking Jan. 2015 (2015): 218., 2015, 1-14.

Novo, Oscar et al., "Capillary Networks—Bridging the Cellular and IoT Worlds", Internet of Things (WF-IoT), 2015 IEEE 2nd World Forum on. IEEE, 2015., 2015, 1-8.

* cited by examiner

100

200

400

METHODS, SYSTEMS, AND DEVICES FOR MANAGING CLIENT DEVICES USING A VIRTUAL ANCHOR MANAGER

FIELD OF THE DISCLOSURE

The subject disclosure relates to methods, systems, and devices for managing client devices using a virtual anchor management.

BACKGROUND

Customer premises including residential homes and commercial building can have a network of various sensors or Internet of Things (IoT) devices to measure, record, configure, or provide services or applications for the occupants with regard to different premises devices and/or appliances. Further, the network of IoT devices can be coupled to a communication network that may be a heterogeneous network comprising cellular, WiFi, and/or Bluetooth networks such as a 5G network. Network service nodes that provide or gather data from the IoT devices via the 5G network to provide services and applications to occupants of the customer premises. Further, the IoT devices can have client software that include protocol stacks that allow them to provide and receive data to network services nodes requiring them to consume high power levels even though having a limited battery capacity.

BRIEF DESCRIPTION OF THE DRAWINGS

Reference will now be made to the accompanying drawings, which are not necessarily drawn to scale, and wherein.

DETAILED DESCRIPTION

Figure 1:
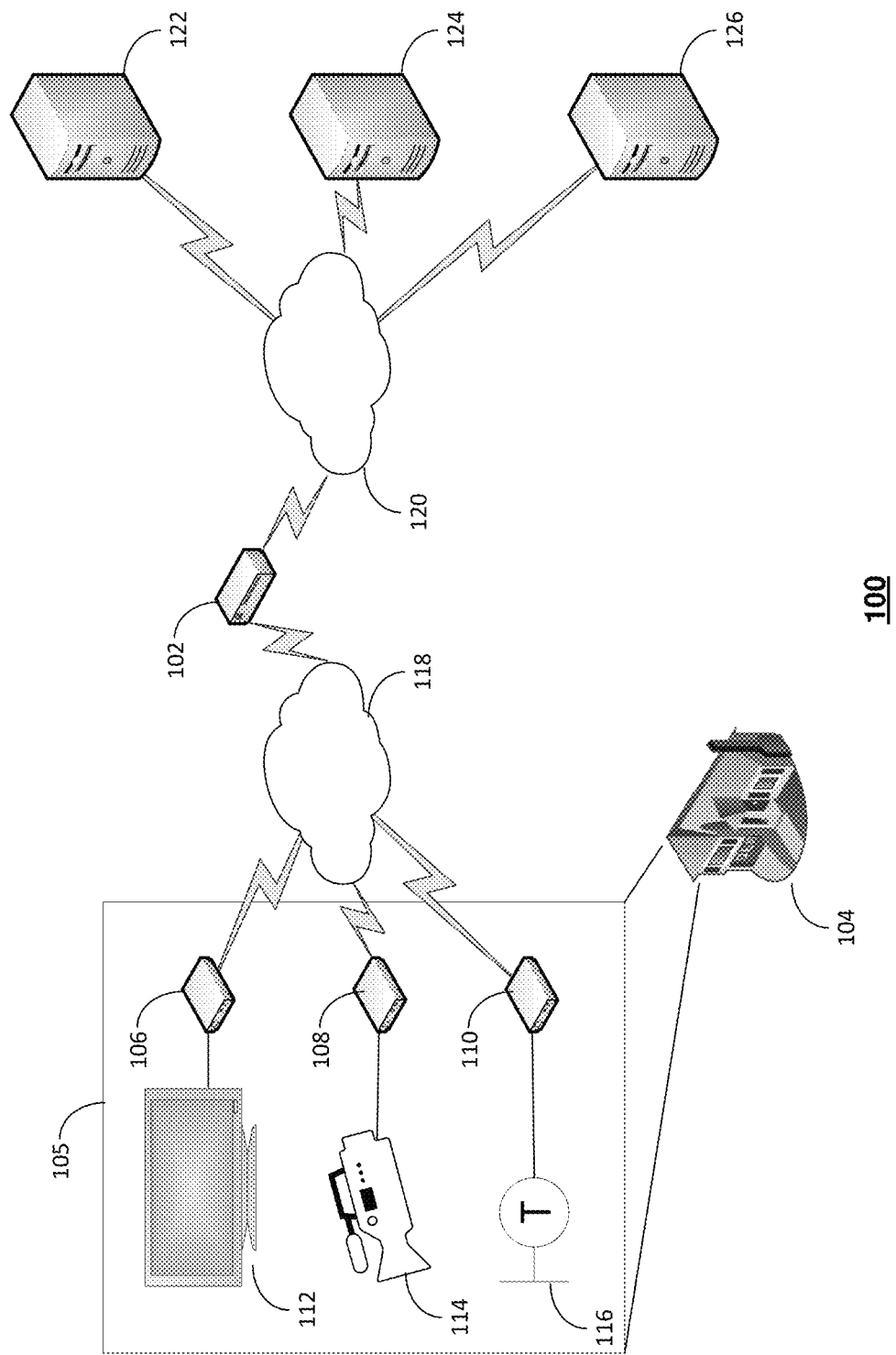
FIGS. 1-6 depict illustrative embodiments of systems for multiplexing service information from sensor data.

The subject disclosure describes, among other things, illustrative embodiments for continuously connecting to a control plane of a wireless communication network. The wireless communication network includes equipment operating in at least one of the control plane and a user plane. Further embodiments include receiving control information across the control plane indicating that client data is to be received on the user plane of the wireless communication network for a client device. Additional embodiments include accessing a first protocol stack via a network node according to the control information. Also, embodiments include receiving the client data for the client device over the user plane using the first protocol stack, wherein the client device includes a thin client function. Further embodiments include providing the client data for the client device over a premises communication network. Other embodiments are described in the subject disclosure.

One or more aspects of the subject disclosure include a device. The device comprises a processing system including a processor and a memory that stores executable instructions that, when executed by the processing system, facilitate performance of operations. Operations include continuously connecting to a control plane of a wireless communication network. The wireless communication network includes equipment operating in at least one of the control plane and a user plane. Further embodiments include receiving control information across the control plane indicating that client data to be received on the user plane of the wireless communication network for a client device. Additional embodiments include accessing a first protocol stack from a network node according to the control information. Also, embodiments include receiving the client data for the client device over the user plane using the first protocol stack, wherein the client device includes a thin client function. Further embodiments include providing the client data for the client device over a premises communication network.

One or more aspects of the subject disclosure include a machine-readable storage medium, comprising executable instructions that, when executed by a processing system including a processor, facilitate performance of operations. Operations include operating in an idle state, wherein the idle state consumes a low level of power. Further operations include operating in an active state in response to receiving an awake signal from a virtual anchor management node over a premises communication network. The virtual anchor management node obtains client data over a wireless communication network that includes equipment operating in at least one of a control plane and a user plane. The virtual anchor management node is continuously connecting to the control plane of the wireless communication network. The wireless communication network includes equipment operating in at least one of the control plane and the user plane. Additional operations include receiving client data from the virtual anchor management node over the premises communication network. Also, operations include accessing service information according to the client data from a device. Further operations include sending the service information to the virtual anchor management node over the premises communication network.

One or more aspects of the subject disclosure include a method. The method includes continuously connecting, by a processing system including a processor, to a control plane of a wireless communication network. The wireless communication network includes equipment operating in at least one of the control plane and a user plane. Further, the method includes receiving, by the processing system, client instructions from a control device. The client instructions include IP address for a client device. In addition, the method includes identifying, by the processing system, a unique identifier for the client device according to the IP address. Also, the method includes sending, by the processing system, the client instructions to the client device according to the unique identifier.

FIGS. 1-6 depict illustrative embodiments of systems for multiplexing service information from sensor data. Referring to FIG. 1, one or embodiments of a system 100 include a service multiplexer 102 coupled to and in communication with several network services nodes 122, 124, 126 over a communication network 120. In some embodiments, the communication network 120 can be a 5G communication network. In further embodiments, the communication network can also be a communication network that includes wireless networks such as cellular networks, WiFi networks, and Bluetooth networks. In other embodiments, the service multiplexer can be coupled to and in communication with sensors 106, 108, 110 over a communication network 118. Further, communication network 118 can be referred to a sensor/IoT network. Sensors 106, 108, 110 can be coupled to an appliance or placed in a room to detect environmental conditions, or measure other metrics for a customer premises 104. The customer premises 104 can be a residential home or a commercial building. Further, in some embodiments, service multiplexer 102 and/or communication network 118 can be located within the customer premises 104. In other embodiments, service multiplexer 102 and portions of communication network 118 can be located outside customer premises. In addition, sensors 106, 108, 110 can be referred to as Internet of Thing (IoT) devices. Sensors and/or IoT devices perform similar functions such as communicating with one or more network services nodes 122, 124, 126 that include receiving instructions and commands from the networks services node to control a premises device of appliance and exchanging content or data as well as receiving instructions or content from other sensors/IoT devices via the service multiplexer 102.

In one or more embodiments, the sensor 106 can be communicatively coupled to a media device (e.g. television), the sensor 108 can be communicatively coupled to a video surveillance camera 114, and the sensor 110 can be communicatively coupled to a thermostat 116. In one or more embodiments, the service multiplexer is communicatively coupled to network services nodes 122, 124, 126 over a communication network 120. In some embodiments, the network services node 122 can be a media server operated by a media service provider. In other embodiments, the network services node 124 can be a premises security server operated by a premises security service provider. In further embodiments, the network services node 124 can be a utility server operated by a power utility company.

In one or more embodiments, the communication network 118 may be an Internet Protocol (IP) network such that all devices on the communication network 118 each have an IP address. In other embodiments, the communication network 118 may be a non-IP communication network an each device on the communication network has another type of unique identifier. In some embodiments, the service multiplexer 102 may exchange information between the network services node 122, 124, 126 and the sensors/IoT devices 106, 108, 110 to test the operation of the sensor/IoT device. In further embodiments, the sensor/IoT device 106, 108, 110 may have a Subscriber Identity Module (SIM) that can used in testing and controlling the operations of the sensor/IoT device 106, 108, 110.

In one or more embodiments, a user associated with the customer premises 104 may request media content to be presented on the media device 112. Thus, the service multiplexer 102 may receive the media content from the media server 122 and provide the media content to the media device 112 for presentation. In some embodiments, the video surveillance camera 114 may capture video of portions of the customer premises 104 environment and provide the service multiplexer 102 with the captured video. Further, the service multiplexer 102 may provide the captured video to the premises security server 124 for further analysis (e.g. image processing to determine whether a possible intruder on the customer premises). In other embodiments, the user may provide instructions from a mobile phone to the utility server 126 to decrease the heat in the customer premises 104 while the user is traveling away from the customer premises 104. The utility server 126 may then provide a command to decrease the heat of the customer premises 104 to the service multiplexer 102. Further, the service multiplexer 102 can provide the command to the thermostat 116.

In one or more embodiments, the user may create a service portfolio for customer premises 104 security using the media device 112, video surveillance camera 114, and thermostat 116 as well the associated sensors/IoT devices 106, 108, 110. Further, the user can create tailored application using devices 112, 114, 116 and sensors/IoT devices 106, 108, 110 within a service portfolio or across different service portfolios. Example service portfolios can be a media device 112 such as a television as well as a tablet computer and smartphone can be part of a media service portfolio with the customer premises. Further, the user can configure the service portfolio to include devices such as the media device 112, tablet computer, and smartphone. Thus, when media content is requested from the media server 122 by the user from a control device (e.g. smartphone, computer, remote control, home assistant (e.g. Google™ Home, Amazon™ Echo, etc.), etc.), the service multiplexer 102 retrieves the media content from the media server 122 and provides the media content to the media device 112, tablet computer, and/or smartphone (e.g. based on the presence information).

Another example service portfolio can include the video surveillance camera 114 as well as door contact sensor and window breaking sensors located throughout the customer premises 104. Captured video is provided to the premises security server 124 through the service multiplexer 102. Further, alarms associated with unauthorized access to the customer premises 104 detected by the door contact sensors and window breaking sensors are provided to the premises security server 124 through the service multiplexer 102. Based on these alarms, the premises security server 125 can initiate dispatch of emergency personnel to the customer premises 104 as well as notify the user via alerts to user smartphone.

A further example service portfolio can include the thermostat 116 as well as a power meter associated with the customer premises 104. Recorded data from the thermostat as well as the power meter can be provided to the utility server 126 through the service multiplexer 102. Further, the utility server 126 can archive such data for analysis to determine power efficiency of the customer premises 104.

In one or more embodiments, the user can configure a service portfolio for specific purposes. Further, the user can create a tailored application within the service portfolio (or across service portfolios) using some or all of the devices that provide information for the service. For example, the media device 112 and sensor/IoT device 106 as well as the video surveillance camera 114 and sensor/IoT device 108 may be part of a tailored application configured by the user. That is, the user may configure using a control device (e.g. smartphone, computer, etc.) to generate the tailored application of viewing video captured by the video surveillance camera 114 on the media device. In some embodiments, the service multiplexer 102 receives the configuration information of the tailored application. In some embodiments, the service multiplexer 102 automatically or in response to further user input can request captured video from the premises security server 124 and provide the captured video to the media device 112 for presentation. In other embodiments, the service multiplexer 102 automatically or in response to further user input can retrieve captured video stored in the video surveillance camera 114 (or other premises storage device) and provide the captured video to the media device 112 for presentation.

As another example, the user can create a tailored application that includes the video surveillance camera 114 and sensor/IoT device 108 as well as thermostat 116 and sensor/IoT device 110. The video surveillance camera 114 can provide the premises security server 124 with captured video through the service multiplexer 102. The premises security server 124 can identify an intruder using image processing techniques on the captured video. Further, the premises security server 124 can use information from the thermostat 116 to determine whether the user is within the customer premises 104 when the intruder was detected. That is, the user may have configured the tailored application a priori that if the thermostat is below 66 degrees then the user is not within the customer premises 104. However, if the thermostat is 66 degree and above then the user may be within the customer premises 104. Thus, when the premises security server 124 detects a possible intruder, the premises security server 124 may query the service multiplexer 102 for the current temperature level of the thermostat 116. The service multiplexer 102 can retrieve from the thermostat 116 the current temperature level and forward such information to the premises security server 124. In response to receiving the current temperature level of the thermostat 116 and determining whether it is above or below the 66 degree threshold, the premises security server 124 sends a message to emergency personnel and/or to the user. If the current temperature level is above 66 degrees, then the user is likely to be within the customer premises 104 and the premises security server 124 may call a landline telephone within the customer premises to notify the user. However, if the current temperature level is below 66 degrees then the user is not likely within the customer premises 104 and the premises security server 124 may call the user's smartphone to notify the user of the possible intruder.

In one or more embodiments, the user may dynamically group some of the sensors/IoT devices 106, 110, 114 into a service portfolio or tailored application. Further, the user may create user configurable definable module that can integrate with a service. For example, the media device 112 and thermostat 116 can be part of a user configurable definable module of a tailored application as part of a customer premises security service as described herein.

In one or more embodiments, the service multiplexer 102 is communicatively coupled to network services nodes 122, 124, 126 over communication network 120. In some embodiments, the communication network 120 is a 5G network that can be a heterogeneous communication network comprising wireless, cellular, WiFi, and/or Bluetooth networks that has a control plane and a user plane. The service multiplexer 102 can be configured to have an "always-active-session" on the control plane of communication network 120 that communicates with network services nodes 122, 124, 126. Instead of using network resources within communication network 120 in every instance there is communication between the service multiplexer 102 and one of the network services nodes 122, 124, 126, the network resources are used only once to provide communication between the service multiplexer 102 and one of the network services nodes 122, 124, 126 thereby increasing the efficiency in using network resources. In other embodiments, the service multiplexer 102 initiates communication on the user plane of the communication network 120 between itself and one of the network services nodes 122, 124, 126 when the service multiplexer 102 provides data from one of the sensors 106, 110, 114 and/or devices 112, 114, 116. In further embodiments, one of the network services nodes 122, 124, 126 initiates communication on the user plane of the communication network 120 between itself and the service multiplexer 102 when the one of the network services node 122, 124, 126 provides data to one of the sensors/IoT devices 106, 110, 114 and/or devices 112, 114, 116.

As described herein, communication, including exchange of data and control information, between devices 112, 114, 116 and service multiplexer 102 can be done via the sensors/IoT devices 106, 108, 110 communicative coupled to the devices 112, 114, 116.

Figure 2:
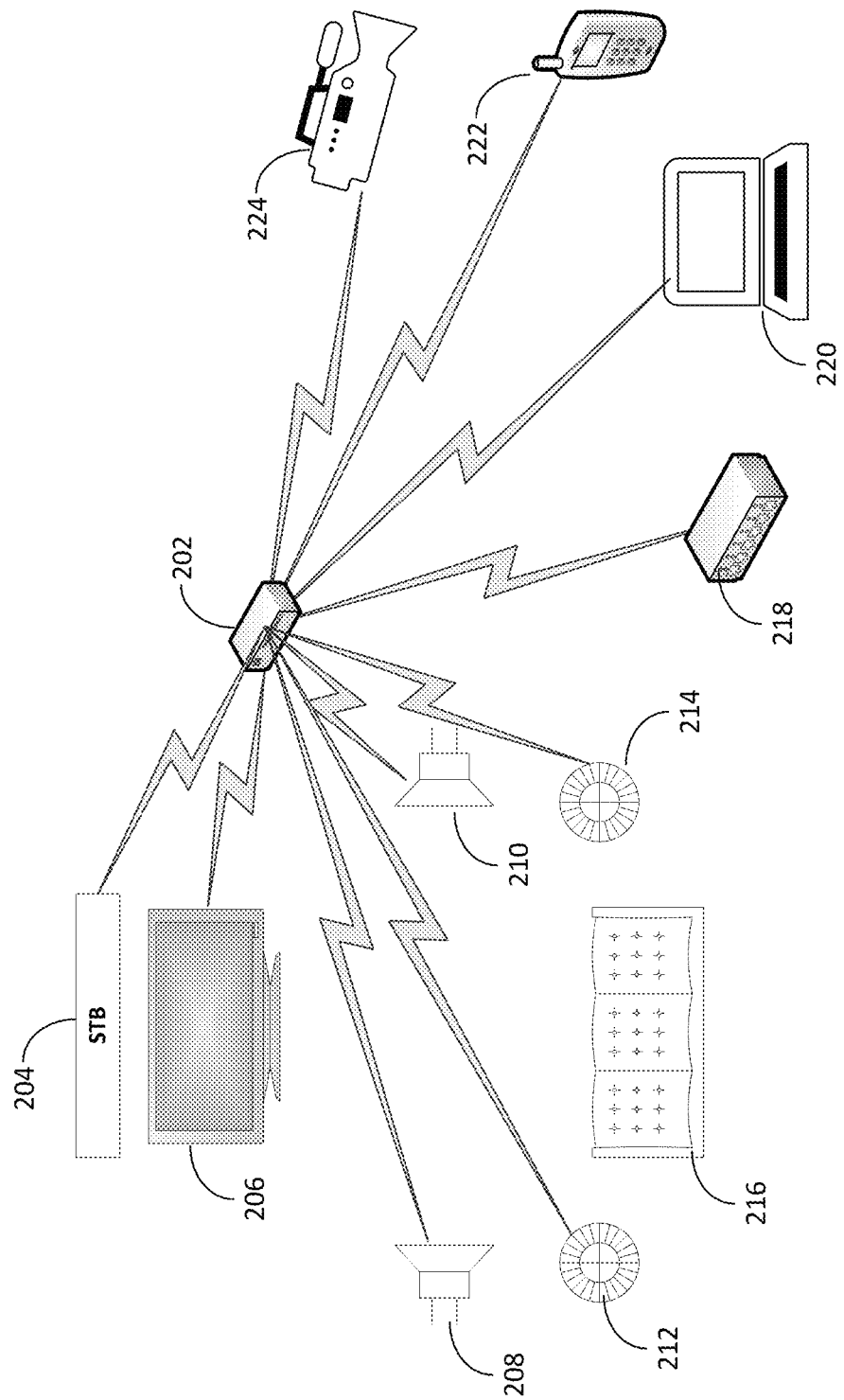

Referring to FIG. 2, in one or more embodiments of a system 200 a customer premises can include a several devices such as a set top box 204, media device (e.g. television) 206, speakers 208, 210, lamps 212, 214, home assistant 218, computer 220, smartphone 222, and video surveillance camera 224. Each of the devices 204-224 can be communicative coupled to a sensor or IoT device (not shown) to exchange data and control information to a service multiplexer 202 or to one or more network services nodes via the service multiplexer 202. Further, the customer premises may arrange the set top box 204, media device 206, speakers 208, 210 and lamps 212, 214 around a living area that includes a couch 216. A user of the customer premises 200 may configure the devices 204-224 into one or more service portfolios and/or tailored applications using dynamic grouping and/or user configurable definable modules. The service multiplexer 202 can exchange communication among devices configured in such service portfolios, devices implementing tailored applications, among themselves and/or network services nodes.

Figure 3:
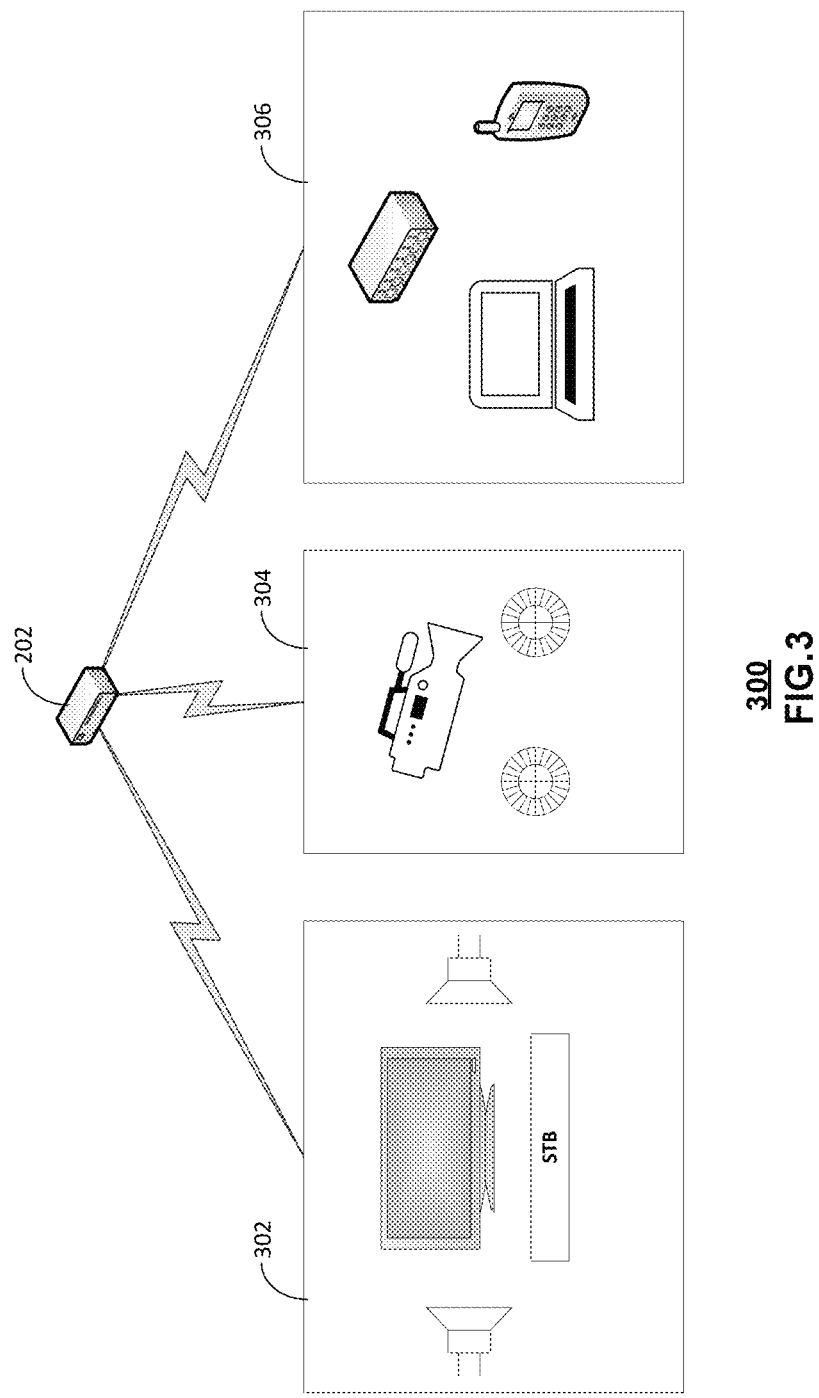

Referring to FIG. 3, in one or more embodiments of system 300, a customer premises can include devices 204-224 communicatively coupled to the service multiplexer 202. Each of the devices 204-224 can be communicative coupled to a sensor or IoT device (not shown) to exchange data and control information to a service multiplexer 202 or to one or more network services nodes via the service multiplexer 202. A user associated with the customer premises can dynamically group some of the devices into different service portfolios. For example, the user can configure the media device, speakers, and set top box into a media service portfolio 302. In another example, the user can configure the video surveillance camera and lamps in a premises security service portfolio 304. In a further example, the user can configure a home assistant, computer, and smartphone into a control service portfolio 306. The service multiplexer 202 can be communicatively coupled to the devices in each of the service portfolios 302, 304, 306 over a premises communication network (i.e. sensor/IoT device communication network). The service portfolios 302, 304, 306 can be created by the user or a smart home system as default or conventional service portfolios.

In one or more embodiments, the user can interact and the services of devices in the media service portfolio in different ways. Further, the user can create a tailored application using devices from the media service portfolio as well as devices from other service portfolios. A tailored application implemented by several devices by dynamically grouping the devices for implementing the tailored application or creating user configurable definable modules comprising the devices that implement the tailored application. For example, a user can create a tailored application for selecting, presenting, and recording media content by dynamically grouping or creating user configurable definable modules comprising devices such as the media device, set top box, and smartphone. The user can select media content from provided by a media server to be presented on the media device. Further, the user can select media content using the smartphone to be delivered by the media server to be recorded by a digital video recorder communicatively coupled to the set top box. In such an example, the service multiplexer 202 can receive instructions for selecting the media content from the smartphone and provide the instructions to the media server. Further, the service multiplexer can receive the media content from the media server and provide the media content to the media device for presentation or the set top box for recording.

In one or more embodiments, the user can create a tailored application to view captured video from the video surveillance camera on the computer. In some embodiments the user may be using the computer at the customer premises and in other embodiments the user may be using the computer at a location remote to the customer premises. In further embodiments, the video surveillance camera captures video of the customer premises environment and provides the captured video content to a premises security server for storage. The user can provide instructions from the computer to the service multiplexer 202. Further, the service multiplexer 202 can deliver the instructions to the premises security server. In response, the premises security server can retrieve the captured video content from storage and provide the captured video content to the service multiplexer 202. Further, the service multiplexer 202 delivers the captured video content to the computer for viewing by the user.

Each of the devices can be communicative coupled to a sensor or IoT device (not shown) to exchange data and control information to a service multiplexer 202 or to one or more network services nodes via the service multiplexer 202.

Figure 4:
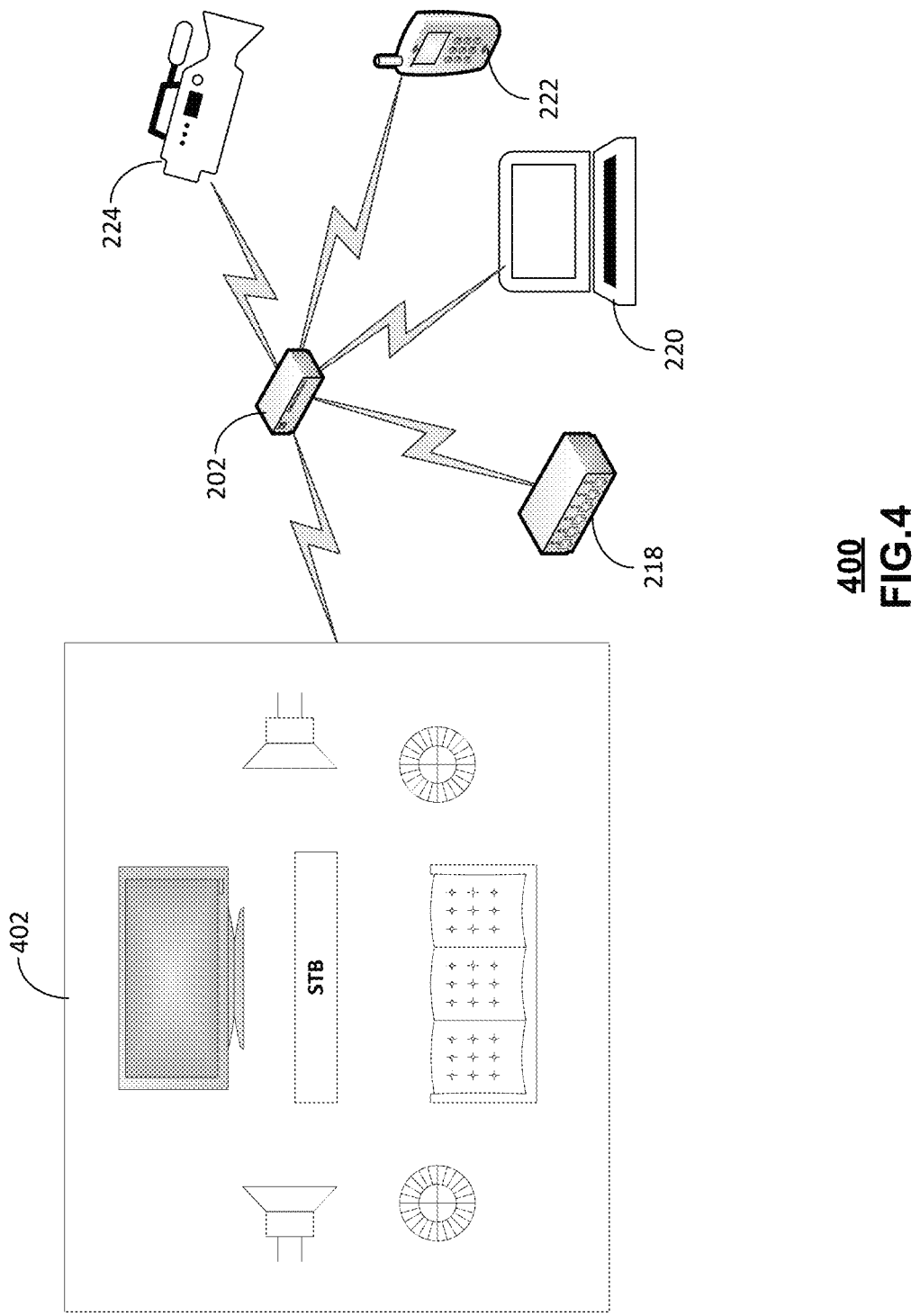

Referring to FIG. 4, in one or more embodiments, a user can create a customer service portfolios or a tailored application from default or conventional service portfolios. For example, the user can configure a custom home theater service portfolio or home theater tailored application 402 that includes a media device, set top box, speakers, and lamps. In some embodiments, the home theater service portfolio or home theater tailored application 402 can include a home assistant 218 as a control device. The home theater service portfolio or home theater tailored application 402 can be created using dynamic grouping of the devices or creating user configurable definable modules that include the devices.

In one or more embodiments, the user can use the voice activation/recognition capability of the home assistant 218 to select media content from a media server to be presented on the media device. The home assistant 218 can provide instructions to the service multiplexer 202 which can be delivered to the media server. In response, the media server provides the requested media content to the service multiplexer 202. Further, the service multiplexer can deliver the media content to the media device and/or set top box for presentation and/or recording. In some embodiments, the user can use the voice activation/recognition capability of the home assistant 218 to control the volume of the speakers. Instructions on volume control can be provided to the service multiplexer 202. In addition, the service multiplexer 202 can then provide the instruction on volume control to each of the speakers. In other embodiments, the user can use the voice activation/recognition capability of the home assistant 218 to control the illumination level of the lamps. Instructions to control the illumination level of the lamps can be provided to the service multiplexer 202. Instructions to control the illumination level of the lamps can be provided to the service multiplexer 202. Also, the service multiple 202 can deliver the instructions to control illumination to the lamps.

Each of the devices can be communicative coupled to a sensor or IoT device (not shown) to exchange data and control information to a service multiplexer 202 or to one or more network services nodes via the service multiplexer 202.

Figure 5:
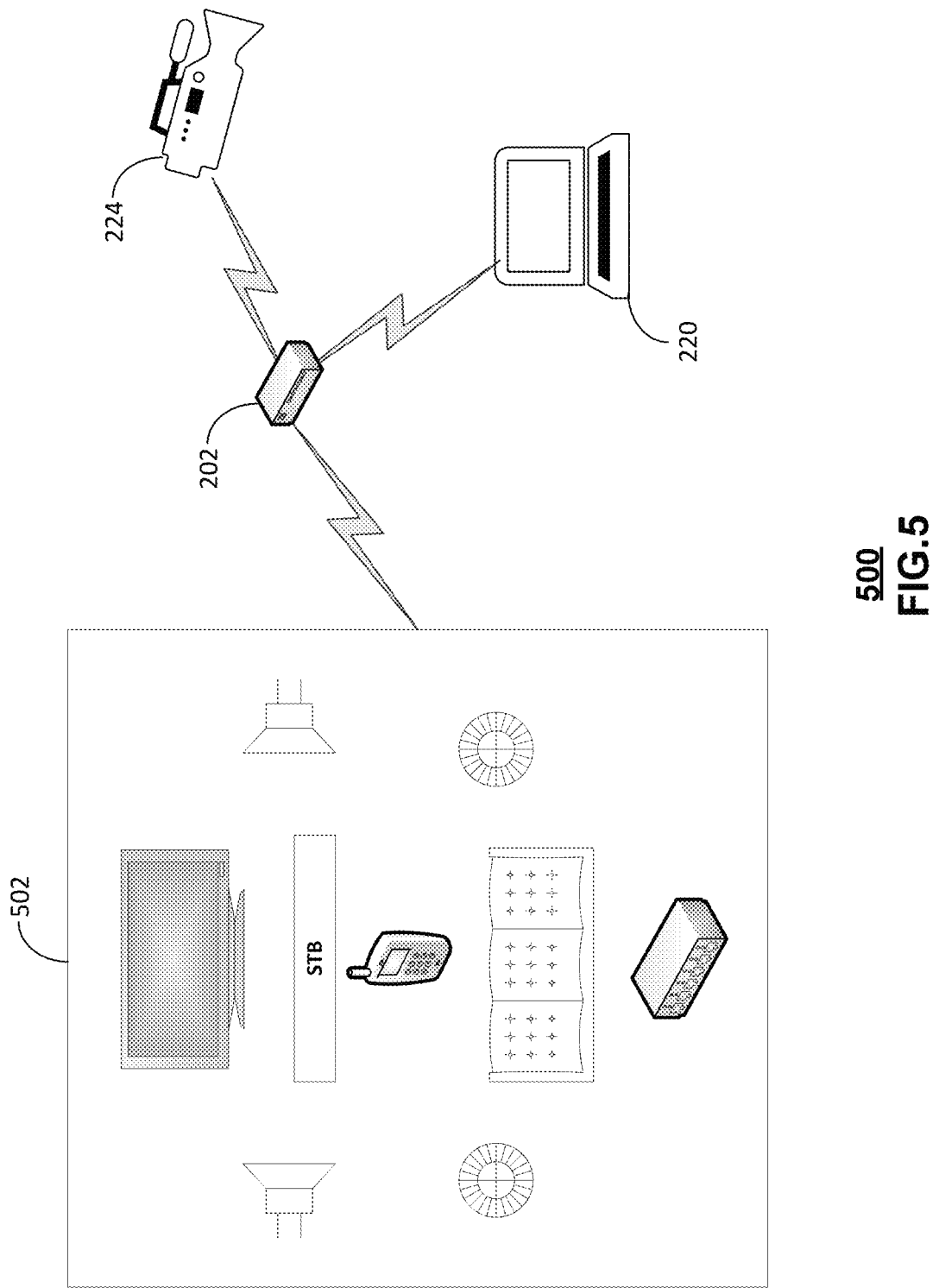

Referring to FIG. 5, the user can further customize a home theater service portfolio or home theater tailored application 502 after using the home theater service portfolio or home theater tailored application 402 to include a smartphone as a control device. The user can use dynamic grouping or user configurable definable modules to add the smartphone to the home theater service portfolio or home theater tailored application. Thus, instead of using a home assistant, the user can control selection/recording of media content as well as control of volume of speakers and illumination level of lamps with the smartphone. Thus, instructions for the selecting the media content are sent to the service multiplexer 202 from the smartphone and provided to a media server. In response, the media server provides the selected media content to the service multiplexer 202. Further, the service multiplexer 202 delivers the selected media content to the media device and/or set top box. Also, the service multiplexer 202 can receive instructions from the smartphone for volume control of the speakers or illumination level of the lamps. In addition, the service multiplexer 202 can deliver instructions for volume control to the lamps and illumination level to the lamps, accordingly.

Each of the devices 204-224 can be communicative coupled to a sensor or IoT device (not shown) to exchange data and control information to a service multiplexer 202 or to one or more network services nodes via the service multiplexer 202.

Figure 6:
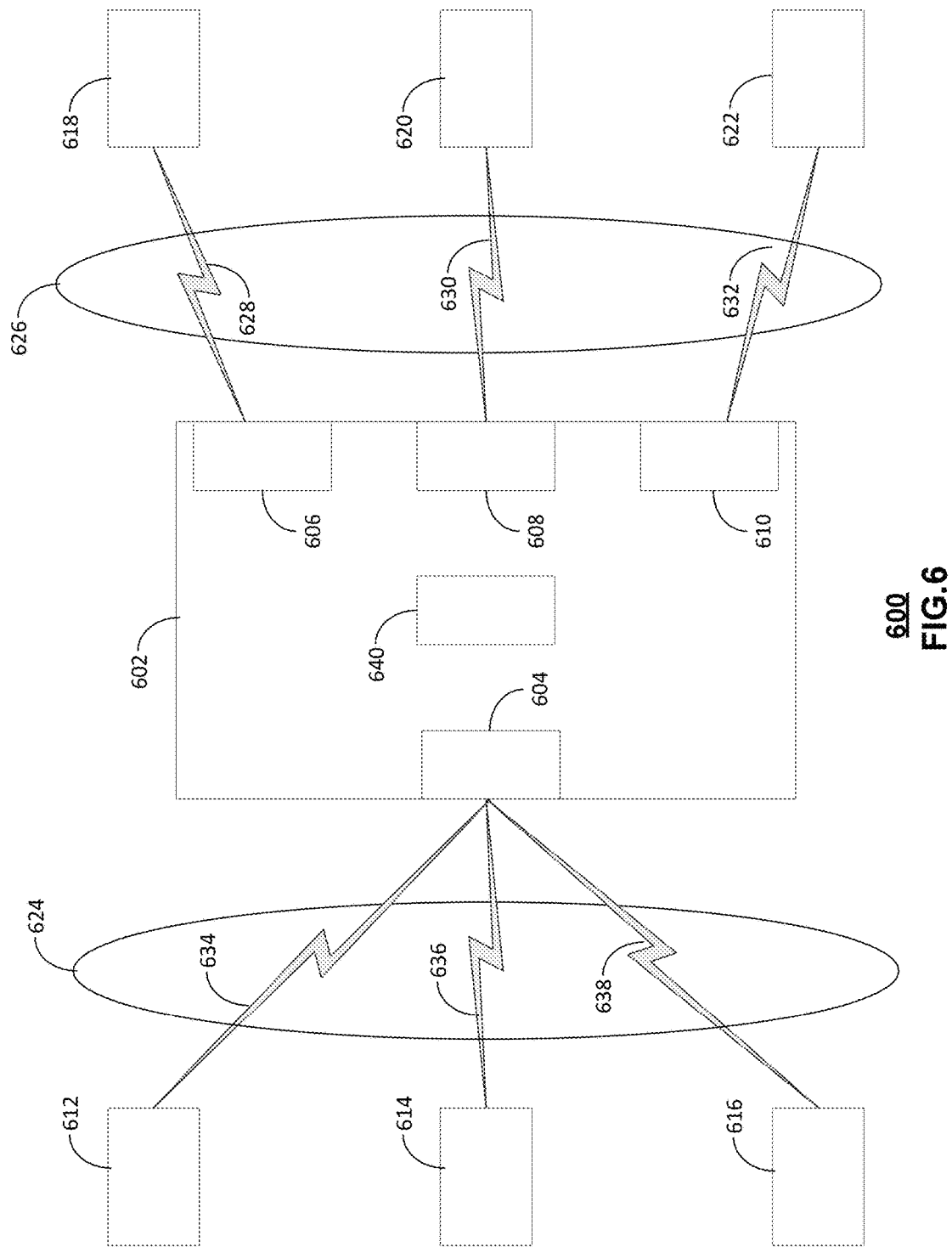

Referring to FIG. 6, one or more embodiments includes a system 600 includes service multiplexer 602 communicatively coupled to network services nodes 618, 620, 622 over a communication network 626. In some embodiments, the communication network 626 is a 5G wireless network that can be a heterogeneous communication network comprising cellular, WiFi, and Bluetooth networks. Further, the 5G communication network includes a control place and user plane. In addition, the service multiplexer 602 includes one or more communication functions 606, 608, 610 that are implemented by software and hardware components such as protocol stacks, processing systems, and memory devices. Further, communication links 628, 630, 632 may carry communication sessions between the service multiplexer 602 and the network services nodes 618, 620, 622 and use communication functions 606, 608, 610. In some embodiments, a communication session over communication links 628, 630, 632 can be an "always-active-session" connected the control place of the 5G communication network 626. Having the "always-active-session" continuously connected to the control plane of the 5G communication network 626 and/or the network services nodes 618, 620, 622 provides for efficient use of network resources. That is, the service multiplexer 602 may be communicating with the network services nodes 618, 620, 622 frequently. Generating a communication session and tearing down a communication session frequently causes the 5G communication network

626 to expend more network resources than having an "always-active-session" continuously connected to the user plane.

In one or more embodiments, the service multiplexer 602 may be coupled to one or more sensor or IoT devices 612, 614, 616 over a premises communication network 624. IoT devices can be communicative coupled to devices within a customer premises to control such devices by a user associated with the customer premises (e.g. media devices, set top boxes, video surveillance cameras, control device, etc.). In some embodiments, the service multiplexer 602 and the premises communication network 624 (i.e. sensor/IoT communication network) may be within the customer premises. In other embodiments, the service multiplexer 602 may be at a location remote to the customer premises and portions of the premises communication network 624 may be within the customer premises and other portion of the premises communication network 624 may be located remote to the customer premises. The premises communication network can be a proprietary communication network, an Internet Protocol (IP) communication network, or a non-IP communication network. Further, the service multiplexer 602 can include a communication function 604 that is implemented by software and hardware components such as protocol stacks, processing systems, and memory devices. Further, communication links 634, 636, 638 may carry communication sessions between the service multiplexer 602 and the IoT devices 612, 614, 616 and use communication functions 604.

In one or more embodiments, the user can configure the service multiplexer 602 using a service management function 640. Further, the service management function 640 is implemented by software and hardware components such as processing systems and memory devices. In addition, a service provider can configure the service management function 640 to initially group the IoT devices 612, 614, 616 (and the devices associated with the IoT devices) into different service portfolios as described herein. Further, a user can configure the service management function 640 to create customer service portfolios and/or tailored applications using dynamic grouping of IoT devices 612, 614, 616 and devices associated with the IoT devices as well as user configurable definable modules that include one or more of the IoT devices 612, 614, 616 and device associated with the IoT devices. Any particular IoT device 612, 614, 616 and device associated with the IoT device can be in more than one service portfolio.

Once a service portfolio or tailored application is created that includes one or more IoT devices 612, 614, 616 (and their associated devices), the service management function 640 can prepare to receive and deliver instructions from control device provide by user input. This can include accessing the protocol stacks needed to communicate with the corresponding network services nodes 618, 620, 622 and IoT devices 612, 614, 616 for the service portfolio or tailored application as well as configuring with the communication functions 604, 606, 608, 610 with the protocol stacks and/or any other logic rules when receiving instructions from a control device for a particular service portfolio or tailored application. Protocol stacks and logic rules can be stored in the service multiplexer 602 or may be accessed from other network nodes accessible by the service multiplexer 602.

For example, the IoT device 616 can be associated with the user's smartphone and IoT device 612 can be associated with the user's media device (e.g. television) as well as IoT device 614 can be associated with the media device speakers. The user can select media content from the smartphone to be presented on the media device. The IoT device 616 sends instructions for retrieving the selected media content to the service multiplexer 602. The communication function 604 receives the instructions. The communication function 604 has been configured a priori by the service management function 640 with logic rules for the service portfolio or tailored application comprising the smartphone, media device, and speakers to relay the instructions to communication function 606, which is communicatively coupled to a network services node 618, which is the media server. The communication function 606 sends the instructions for retrieving the selected media content to the media server. Further, the media server and communication function 606 create a communication session over the user plane of the 5G communication network 626. In addition, the media server sends the selected media content to the service multiplexer 602 via communication session over the user plane. Once the selected media content is received, the communication session between communication function 606 and the media server is torn down. Also, the communication function 606 may store the selected media content on the service multiplexer 602 temporarily. Further, the communication function 604 may access the stored media content and deliver the media content to the media device for presentation. In a further example, the user can control the volume level of the speakers using the smartphone. The smartphone can send the service multiplexer 602 instructions to control the volume of the speakers. The communication function 604 can receive the volume control instructions. The communication function 604 has been configured a priori by the service management function 640 with logic rules for the service portfolio or tailored application comprising the smartphone, media device and speakers to relay the instructions to IoT device 614 to control the volume of the speakers.

Figure 7:
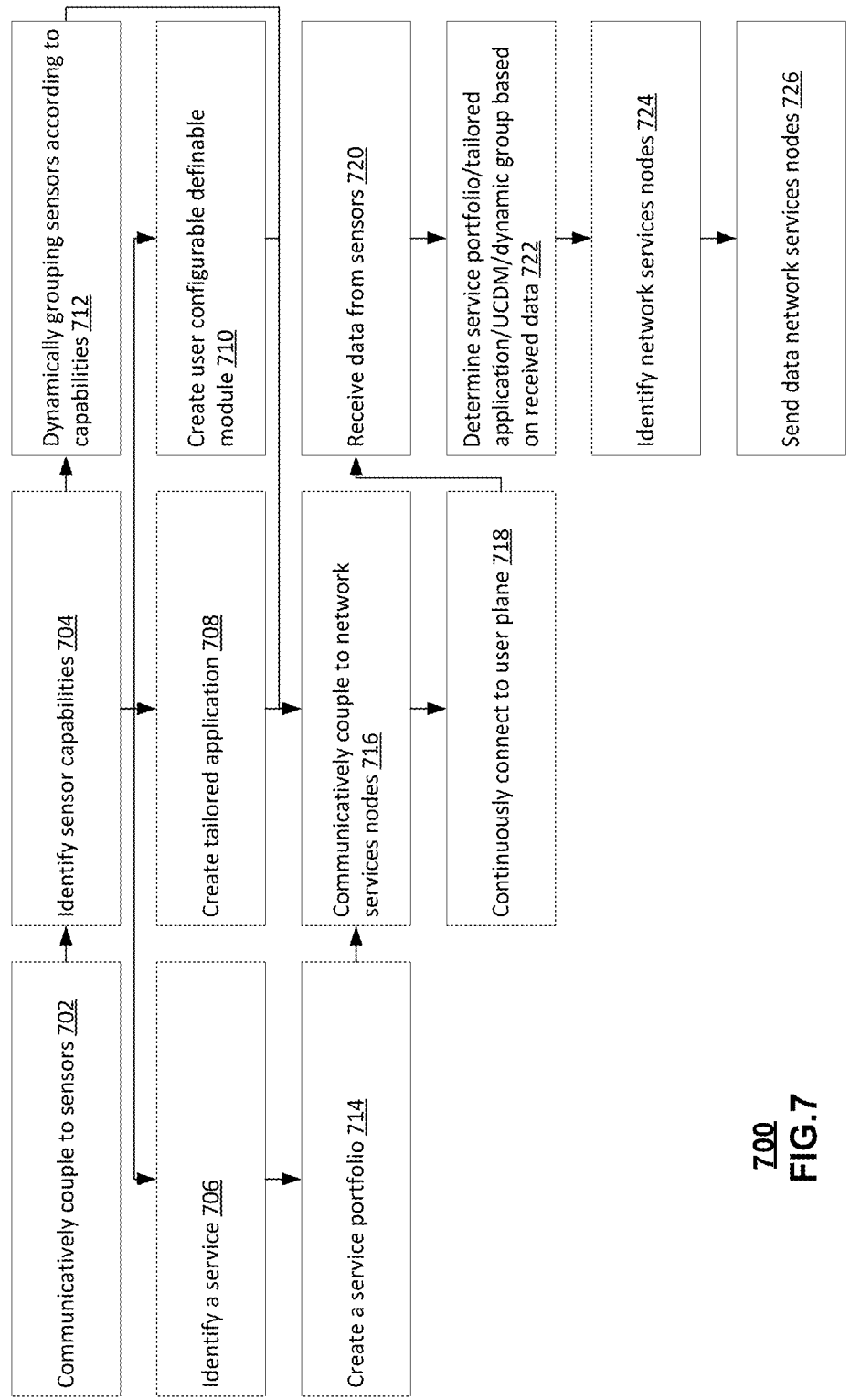
FIG. 7 depicts an illustrative embodiment of a method used in portions of the system described in FIGS. 1-6.

FIG. 7 depicts an illustrative embodiment of a method used in portions of the system described in FIGS. 1-6. The method 700 can be implemented by a service multiplexer described herein. The method 700 can include, at 702, communicatively coupling to multiple sensors or IoT devices over a communication network. The communication network may or may not support an Internet Protocol (IP). Each sensor or IoT device can be associated with a device on a customer premises. Further, the method 700 can include, at 704, identifying capabilities of the multiple sensors or IoT devices. In addition, the method 700 can include, at 706, identifying at least one service associated with a plurality of sensors resulting in a group of services. Each of plurality of sensors is associated with at least one of the group of services. That is, two sensors can support one service and two other sensors can support another service, for example. These two services can be grouped into a service portfolio. The method 700 can include, at 712, creating a service portfolio according to the group of services. Also, the method 700 can include, at 708, comprise creating a tailored application according to the group of services. Further, the method 700 can include, at 710, creating a user configurable definable module according to the group of services. The user configurable definable module can include one or more sensors or IoT devices and their associated devices. In addition, the method 700 can include, at 712, dynamically grouping one or more of the multiple sensors. In some embodiments the user configurable definable modules and or dynamically grouped sensors/IoT devices can be used in a service portfolio or tailored application.

The method 700 can include, at 716, communicatively coupling to multiple network services nodes over a 5th Generation (5G) wireless network according to the service portfolio, tailored application, user configurable definable module, and/or dynamic grouping of sensors/IoT devices. The 5G wireless network includes equipment operating in at least one of a control plane and user plane. Also, the 5G wireless network comprises at least one of a cellular network, WiFi network, and a Bluetooth network. In some embodiments, a portion of the equipment supports connectivity to the control plane and another portion of the equipment supports connectivity to the control plane and user plane. Equipment can include one or more network devices (e.g. control devices, management devices, etc.). In other embodiments, network devices may overlap the two portions of equipment.

Further, the method 700 can include, at 718, continuously connecting to the control plane of the 5G network. Having the service multiplexer continuously connected or having an "always-active" communication session over the control plane to one or more network services nodes is an efficient use of network resources as described herein. In addition, the method 700 can include, at 720, receiving data from the plurality of sensors resulting in received data. Also, the method 700 can include, at 722, determining that the received data is associated with service portfolio, tailored application, user configurable definable module, and/or dynamically created group of sensors/IoT devices. The method 700 can include, at 724, identifying one or more of the network services nodes from the plurality of network services nodes according to the service portfolio, tailored application, user configurable definable module, and/or dynamically created group of sensors/IoT devices. Further, the method 700 can include, at 726, sending the received data to target network services node that can be one of the one or more of the network services nodes over the user plane of the 5G wireless network.

While for purposes of simplicity of explanation, the respective processes are shown and described as a series of blocks in FIG. 7, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 8:
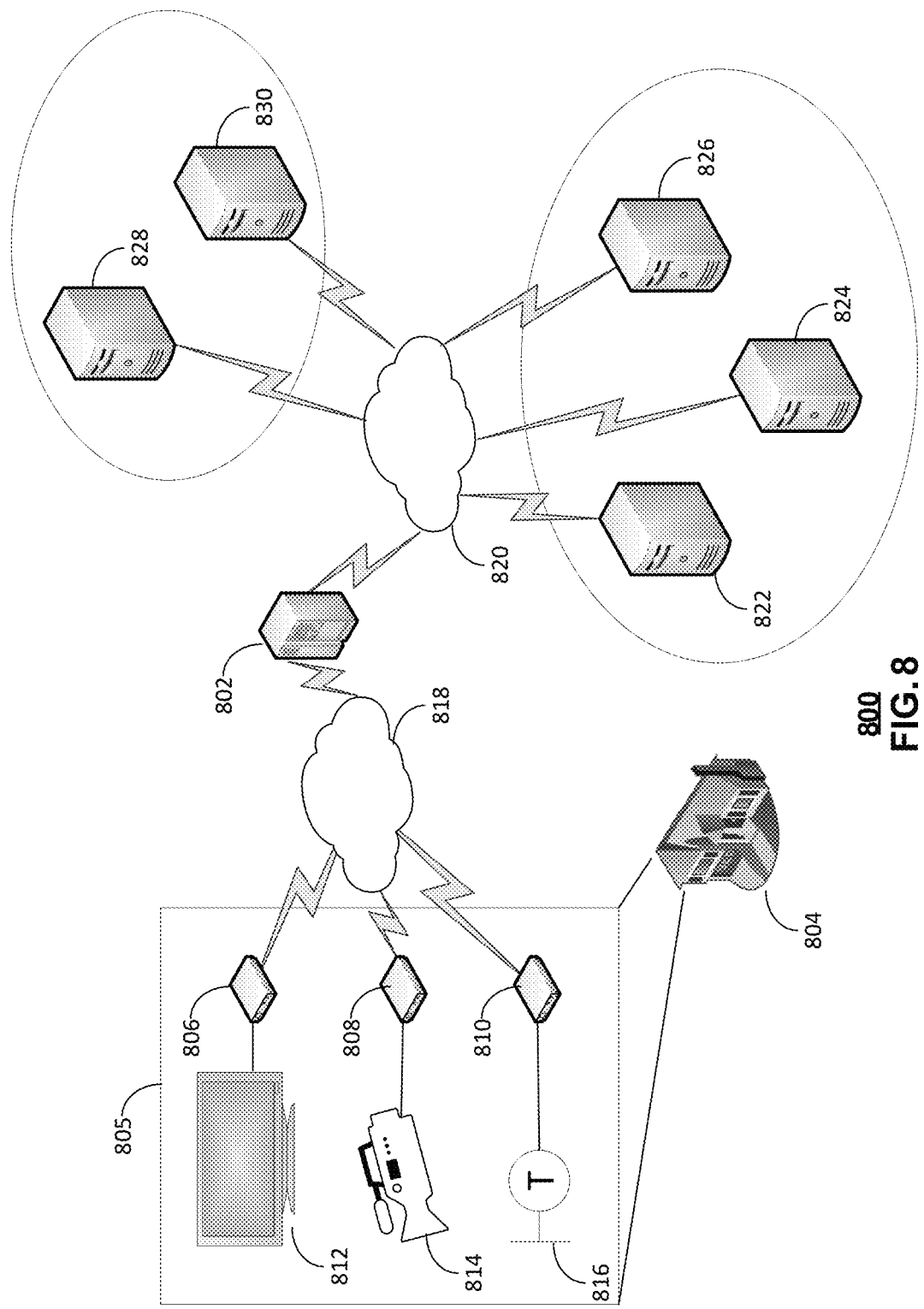
FIGS. 8-9 depict illustrative embodiments of systems managing client devices using a virtual anchor manager.
Figure 9:
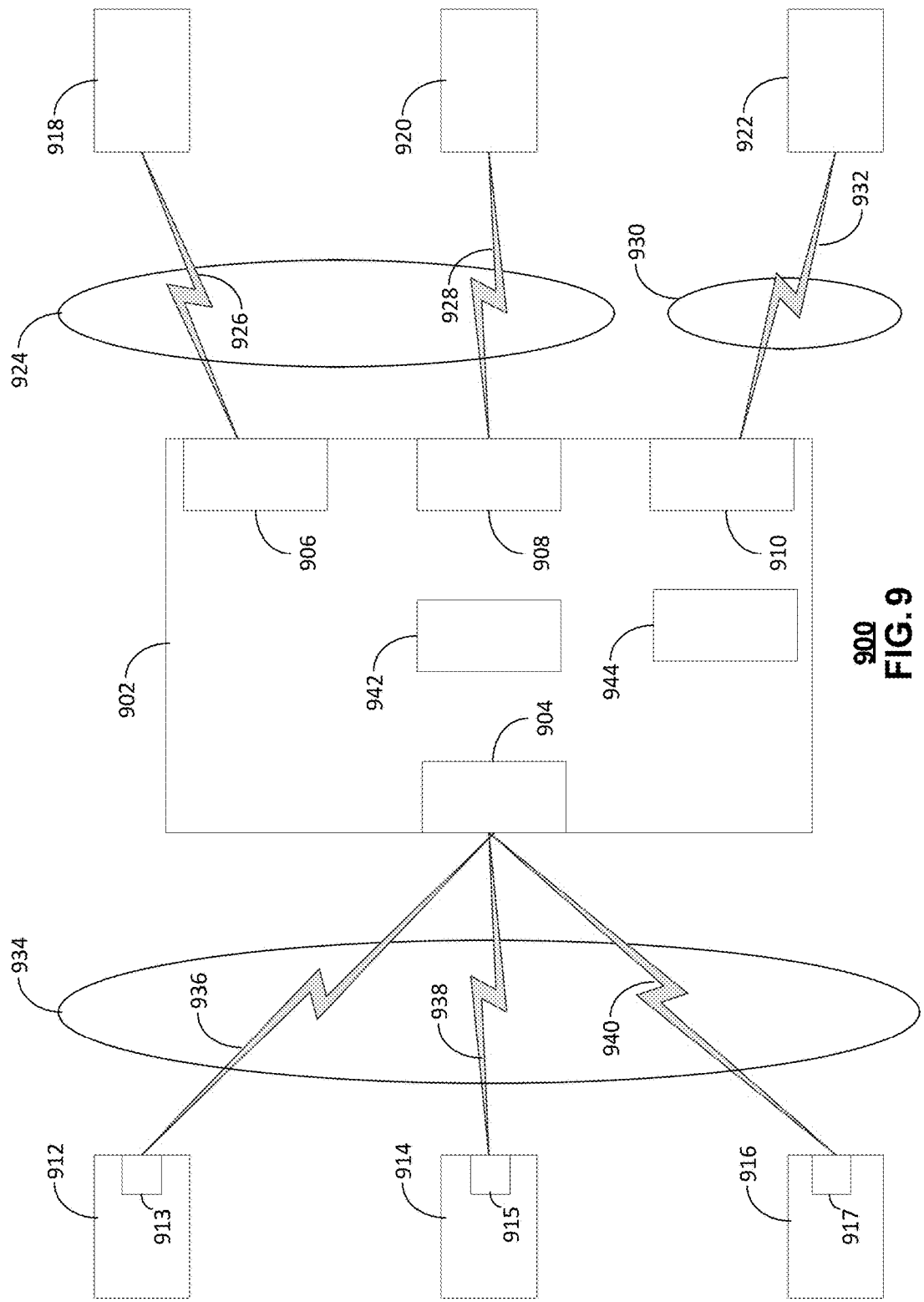

FIGS. 8-9 depict illustrative embodiments of systems managing client devices using a virtual anchor manager. Referring to FIG. 8, in one or more embodiments, a virtual anchor manager 802 can be communicatively coupled to IoT devices 806, 808, 810 of a customer premises 804 over a premises communication network 818. IoT device 806 can be communicatively coupled to a media device (e.g. television), IoT device 808 can be communicatively coupled to a video surveillance camera 814, and IoT device 810 can be communicatively coupled to a thermostat 816. In some embodiments, the virtual anchor manager and the premises communication network 818 may be located within the customer premises 804. In other embodiments, the virtual anchor manger 802 may be at a location remote to the customer premises 804 and a portion of the premises communication network 818 can be within the customer premises 804 and a portion of the premises communication network 818 may be located outside the customer premises 804.

In one or more embodiments, the virtual anchor manager 802 (also can be called a virtual anchor management node) can be communicatively coupled to one or more network services nodes 828, 830 in a core network over a 5G communication network 820. In some embodiments, the virtual anchor manager can be communicatively coupled to a service provider server 822, a valued added service server 824, and smart grid server 826. The 5G communication network 820 can be a heterogeneous network comprising several different wireless networks that include a cellular network, a WiFi network, and a Bluetooth network. Further, the 5G communication network 820 comprises a control plane and a user plane. The control plane includes equipment that assist the 5G communication network 820 in managing network resources (e.g. processing, bandwidth, throughput, etc.). The user plane includes equipment that exchange data and information across the 5G communication network 820. Some equipment can be communicatively coupled to the control plane and the user plane. The virtual anchor manager in one type of device that is communicatively coupled to both the control plane and the user plane of the 5G communication network.

In one or more embodiments, the IoT device 806 associated with the media device 812 may communicate with a media server 828 via the virtual anchor manager 802. Further, the IoT device 808 associated with the video surveillance camera 814 may with a premises security server 830 via the virtual anchor manager 802. In addition, the IoT device 808 associated with the thermostat 816 may communicate with a smart grid server 826 via the virtual anchor manager 802. In some embodiments, each IoT device may communicate with different network services nodes/servers 822, 824, 826, 828, 830.

In one or more embodiments, each IoT device 806, 808, 810 can have limited battery capacity and therefore a limited battery life. Thus, the IoT devices consume low power levels and/or configured to consume low target power levels. In some embodiments, the IoT devices 806, 808, 810 can be configured with one protocol stack to communicate with virtual anchor manager as opposed in other embodiments, supporting different protocol stack with differing complexity to communicate with different network services nodes/servers, 822, 824, 826, 828, 830. Supporting one protocol stack that is not complex would allow the IoT devices to consume power at a low (target) level.

In one or more embodiments, each of the IoT devices 806, 808, 810 also include a thin client software system to communicate with the virtual anchor manager 802 and/or the different network services nodes/servers 822, 824, 826, 828, 830. Such a thin client also limits power consumption by IoT devices 806. 808, 810. In some embodiments, the IoT devices 806, 808, 810 can operate in an idle state when not performing monitoring operations, recording measurements or communicating with the network services nodes/servers 822, 824, 826, 828, 830 via the virtual anchor manager 802. In other embodiments, the IoT devices 806, 808, 810 can operate in an active state when performing monitoring operations, recording measurements or communicating with the network services nodes/servers 822, 824, 826, 828, 830 via the virtual anchor manager 802 as well as any other operation, thereby limiting power consumption. The virtual anchor manager 802 can provide an awake signal to an IoT device 806, 808, 810. In response to receiving the awake signal, an IoT device 806, 808, 810 can transition from an idle state to an active state to perform operations such as monitoring devices 812, 812, 816, recording measurements or communicating with the network services nodes/servers 822, 824, 826, 828, 830 via the virtual anchor manager 802. In other embodiments, IoT devices 806, 808, 810 can be configured with one or more timers. While being in an idle state and responsive to a timer expiring, the IoT devices 806, 808, 810 may transition to an active state to perform operations such as monitoring devices 812, 812, 816, recording measurements or communicating with the network services nodes/servers 822, 824, 826, 828, 830 via the virtual anchor manager 802. After completing operations in an active state, the IoT devices can transition from the active state to an idle state awaiting another timer expiring or awake signal from the virtual anchor manager 802 (or some other network device), thereby limiting power consumption. Limiting power consumption can lead to longer time periods in replacing, charging, or repairing batteries of the IoT devices 806, 808, 810. As customer premises 804 continues to incorporate more IoT devices, managing battery replacement, charge, or repair can be cumbersome.

In one or more embodiments, the virtual anchor manager 802 supports the same protocol stack as the thin client of IoT devices 806, 808, 810. This allows the virtual anchor manager 802 to communicate with any IoT device 806, 808, 810 (or any other IoT device) on the premises communication network. In some embodiments, the premises communication network 818 supports a proprietary technology and proprietary protocol stack that allows the IoT devices 806, 808, 810 and the virtual anchor manager 802 to communicate and/or exchange data with each other. In other embodiments, the technology and protocol stack can be protocol agnostic. In further embodiments, the technology and protocol stack may be off the shelf technology (e.g. IP technology). Further, the virtual anchor manager 802 can include server software technology that interacts with the thin client on the IoT devices 806, 808, 810. Selection of the technology and protocol stack used for devices on the premises communication network 818 allow the IoT devices 806, 808, 810 to operate at a low power level thereby conserving battery life.

In one or more embodiments, the virtual anchor manager 802 communicates with one or more network services nodes/servers 822, 824, 826, 828, 830 over a 5G communication network 820. Further, the virtual anchor manager 802 can access different protocol stacks to communicate with the one or more network services nodes/servers 822, 824, 826, 828, 830. In some embodiments, the virtual anchor manager 802 can access client software to interact with server software on the one or more network services nodes/servers 822, 824, 826, 828, 830. Such protocol stacks and different client software can be stored within a memory device of the virtual anchor manager 802 or can be accessed from storage devices remote to the virtual anchor manager 802. Having the virtual anchor manager 802 perform communication with the one or more network services nodes/servers 822, 824, 826, 828, 830 using the different protocol stacks and/or different client software instead of the IoT devices 806, 808, 810 supporting at least one protocol stack and/or client software allows the IoT devices 806, 808, 810 have thin client software that can be limited or regulated to low (target) power consumption. The virtual anchor manager 802 can has been configured with resources that can consume more power and includes processing system that can use more processing system than the IoT devices 806, 808, 810. The virtual anchor manager 802 can be coupled to a power source (e.g. power outlet, etc.) such that the virtual anchor manager 802 has more available power than the IoT devices 806, 808, 810.

In one or more embodiments, the virtual anchor manager 802 receives data for one of the IoT device 806, 810, 812 from a network services node/server 822, 824, 826, 828, 830. In some embodiments, the virtual anchor manager 802 may be configured with the one or more Internet Protocol (IP) addresses each of which are associated with one of the IoT devices 806, 808, 810. The virtual anchor manager 802 can map the IP address associate with an IoT device 806, 808, 810 with a unique identifier to route information to the IoT devices 806, 808, 810 over the premises communication network 818. The virtual anchor manager 802 can have a table, mapping, database, or other address management scheme that shows the association of an IP address to the unique identifier of the IoT device 806. 808, 810. Such an IP address management mechanism allows the premises communication network 818 support non-IP communication protocols as well as conserve on the use of IP addresses for the IoT devices. That is, in some embodiments, the IP address management scheme can allow one IP address to be used with more than one IoT device 806, 808, 810. In such embodiments, the virtual anchor manager 802 may use additional control or content information in the data to determine the unique identifier of the IoT device 806, 808, 810.

In one or more embodiments, the virtual anchor manager 182 can be configured to have an "always-active-session" on the control plane of communication network 820 that communicates with network services nodes 822, 824, 826, 828, 830. Instead of using network resources within communication network 820 in every instance there is communication between the virtual anchor manager 802 and one of the network services nodes 822, 824, 826, 828, 830, the network resources are used only once to provide communication between the virtual anchor manager 802 and one of the network services nodes 822, 824, 826, 828, 830 thereby increasing the efficiency in using network resources. In other embodiments, the virtual anchor manager 802 initiates communication on the user plane of the communication network 820 between itself and one of the network services nodes 822, 824, 826, 828, 830 when the virtual anchor manager 802 provides data from one of the sensors/IoT devices 806, 810, 814 and/or devices 812, 814, 816. In further embodiments, one of the network services nodes 822, 824, 826, 828, 820 initiates communication on the user plane of the communication network 820 between itself and the virtual anchor manager 802 when the one of the network services node 822, 824, 826, 828, 830 provides data to one of the sensors/IoT devices 806, 810, 814 and/or devices 812, 814, 816.

In one or more embodiments, the IoT devices 806, 808, 810 can be configured to monitor devices 812, 814, 816, record measurements made devices, or communicate with network services nodes 822, 824, 826 828, 830. For example, IoT device can be provided with media content by the media server 828 via the virtual anchor manager 802 to transmit to the media device 812. A further example can be the IoT device periodically recording a list of multiple media content viewed by a user on the media device 812 and providing such a list to the media server 828 via the virtual anchor manager 802. Another example can be IoT device 808 transferring captured video from video surveillance camera 814 periodically (e.g. every two hours) to the premises security server 830. For example, the IoT device 810 can be configured to periodically (e.g. once an hour) to record and transfer thermostat 816 readings to a smart grid server 826.

Referring to FIG. 9, in one or more embodiments, a virtual anchor manager 902 can be communicatively coupled to one or more network services nodes/server 918, 920, 922 over one or more communication networks 924, 930 via communication links 926, 928, 932. Communication networks can be 5G communication networks. The virtual anchor manager 902 communicates with the one or more network services nodes/server 918, 920, 922 using communication protocol stacks/client software 906, 908, 910. In some embodiments, the communication stacks/client software 906, 908, 910 can be accessed from a local storage device 944. In other embodiments, the communication stacks/client software 906, 908, 910 can be accessed from storage devices and/or network devices communicatively coupled to, but at a remote location from, the virtual anchor manager 902.

In one or more embodiments, the virtual anchor manager 902 can communicate with one or more IoT devices 912, 914, 916 over a premises communication network 934 over communication links 936, 938, 940. In some embodiments, the IoT devices 912, 914, 916 and virtual anchor manager 902 can all be within a customer premises such that the premises communication network 934 is also within the customer premises. In other embodiments, the virtual anchor manager 902 may be at a location remote to the customer premises. In such embodiments, portions of the premises communication network 934 may also be at locations remote to the customer premises.

In one or more embodiments, the premises communication network 934 may support IP communication technology/protocol stacks. In other embodiments, the premises communication network 934 can support proprietary or protocol agnostic technology/protocol stacks. Further, each of the IoT devices 912, 914, 916 can include a thin client software 913, 915, 917. In addition, the virtual anchor manager 902 can include a communication stacks/server software 904 that can communicate with each of the IoT devices 912, 914, 916.

In one or more embodiments, the virtual anchor manager 902 includes a processing system 942 that can control and manage the communication stacks/server software/client software 904, 906, 908, 910 as well as store and access data in storage device 944. Further, the processing system 942, storage device, 944, and communication stacks/server software/client software 904, 906, 908, 910 are communicatively coupled with each other.

In one or more embodiments, the virtual anchor manager 902 receives data for one of the IoT device 921, 914, 916 from a network services node/server 918, 920, 922. In some embodiments, the virtual anchor manager 902 may be configured with the one or more Internet Protocol (IP) addresses each of which are associated with one of the IoT devices 912, 914, 916. The virtual anchor manager 902 can map the IP address associate with an IoT device 912, 914, 916 with a unique identifier. The virtual anchor manager 902 can have a table, mapping, database, or other address management scheme stored in storage device 944 that shows the association of an IP address to the unique identifier of the IoT device 912, 914, 916. Such an IP address management mechanism allows the premises communication network 934 to support non-IP communication protocols as well as conserve on the use of IP addresses for the IoT devices 912, 914, 916. That is, in some embodiments, the IP address management scheme can allow one IP address to be used with more than one IoT device 912, 914, 916. In such embodiments, the virtual anchor manager 902 may use additional control or content information in the data to determine the unique identifier of the IoT device 912, 914, 916 (e.g. media content is for IoT device 912 communicatively coupled to a media device, smart grid server instructions for IoT device communicative coupled to a thermostat, etc.).

Figure 10:
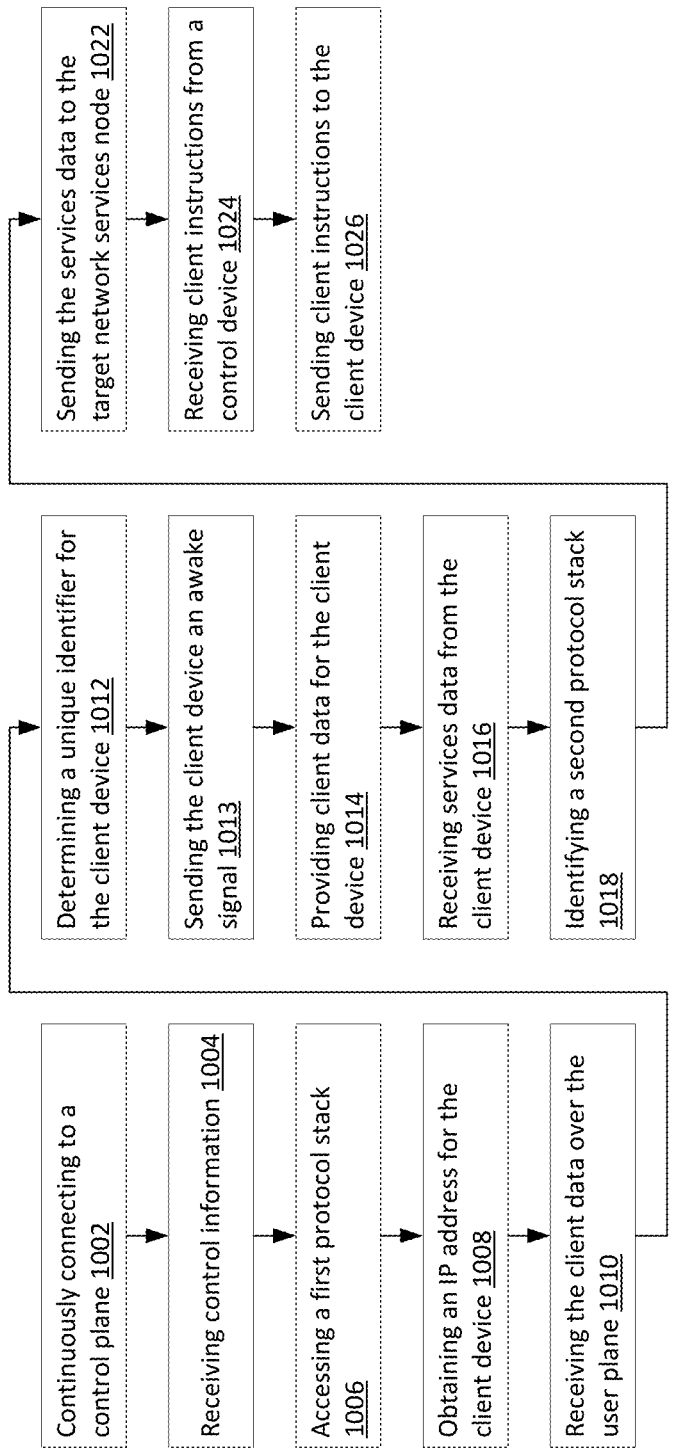
FIGS. 10-11 depict illustrative embodiments of methods managing client devices using a virtual anchor manager.
Figure 11:
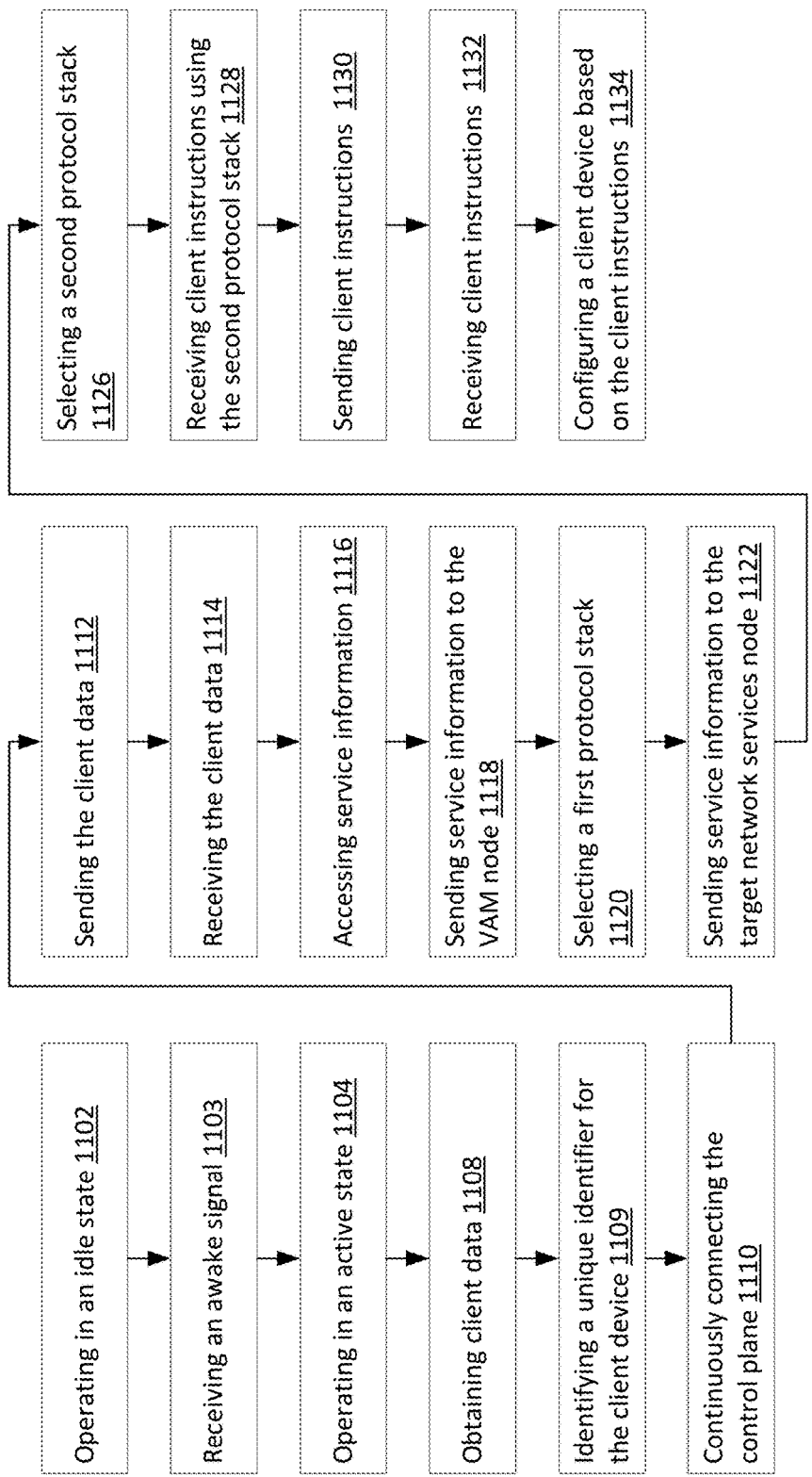

FIGS. 10-11 depict illustrative embodiments of methods managing client devices using a virtual anchor manager. Referring to FIG. 10, the method 1000 can be implemented by a network device such as a virtual anchor manager described herein. The method 1000 includes, at 1002, the virtual anchor manager continuously connecting to a control plane of a wireless communication network. In some embodiments, the wireless communication network can be a 5G communication network. The wireless communication network includes equipment operating in at least one of the control plane and a user plane. Also, the wireless communication network comprises one of a cellular network, WiFi network, and Bluetooth network. Further, the method 1000 includes, at 1004, the virtual anchor manager receiving control information across the control plane indicating that client data to be received on the user plane of the wireless communication network for a client device. In some embodiments, the client device can be a sensor or IoT device. In addition, the method 1000 includes, at 1006, the virtual anchor manager accessing a first protocol stack via a network node according to the control information. In some embodiments, the virtual anchor manager can access the first protocol stack from a storage device communicatively coupled to the virtual anchor manager. Also, the method 1000 includes, at 1008, the virtual anchor manager obtaining an Internet Protocol (IP) address for the client device. Further, the method 1000 includes, at 1010, the virtual anchor manager receiving the client data for the client device over the user plane using the first protocol stack. In some embodiments, receiving of the data comprises receiving of the client data according to the IP address. The client device includes a thin client function.

In addition, the method 1000 includes, at 1012, the virtual anchor manager determining a unique identifier for the client device on the premises communication network according to the IP address. In some embodiments, the virtual anchor manager implements an IP address to unique identifier mapping mechanism. The unique identifier is used by the virtual anchor manager to communicate with the client device over the premises communication network. The method 1000 includes, at 1013, the virtual anchor manager sending the client device an awake signal. The client device may be in an idle state. In response to receiving the awake signal the client device is placed from the idle state consuming a low level of power to an active state allowing the client device to receive the client data. Also, the method 1000 includes, at 1014, the virtual anchor manager providing the client data for the client device over a premises communication network.

The method 1000 includes, at 1016, the virtual anchor manager receiving services data from the client device. Further, the method 1000 includes, at 1018, identifying a second protocol stack and a target network services node according to the services data. In some embodiments, the virtual anchor manager can access the second protocol stack from a remote network device while in other embodiments the virtual anchor manager can access the second protocol stack from a storage device communicatively coupled to the virtual anchor manager. In addition, the method 1000 includes, at 1022, the virtual anchor manager sending the services data to the target network services node using the second protocol stack according to the services data.

The method 1000 includes, at 1024, the virtual anchor manager receiving client instructions from a control device. The client instructions include an IP address for the client device. Further, the method 1000 includes, at 1026, the virtual anchor manager sending the client instructions to client device in response to determining the client device according to the IP address. The virtual anchor manager can use an IP address-to-unique identifier mechanism, as described herein, to identify the client device associated with the IP address.

Referring to FIG. 11, the method 1100 can be implemented by a client device, sensor, and/or IoT device or a virtual anchor management node. The method 1100 includes, at 1102, the client device operating in an idle state. When in an idle state, the client device consumes a lower level of power than in an active state. The client device includes a processing system that implement a thin client (i.e. client software interacting with server software on the virtual anchor management node). Also, the method 1100 includes, at 1103, the client device receiving an awake signal from a virtual anchor management node (i.e. a virtual anchor management node can also be called a virtual anchor manager). Further, the method 1100 includes, at 1104, the client device operating in an active state in response to receiving the awake signal from the virtual anchor management node over a premises communication network. In addition, the method 1100 includes, at 1108, the virtual anchor management node obtaining client data over a wireless communication network that includes equipment operating in at least one of a control plane and a user plane. The method 1100 includes, at 1109, the virtual anchor management node identifying the client device by a unique identifier on the premises communication network by an IP Address referenced in the client data according to an IP address-to-unique identifier mapping mechanism described herein. In some embodiments, the premises communication network does not support Internet Protocol (IP).

Also, the method 1100 includes, at 1110, the virtual anchor management node is continuously connecting to the control plane of the wireless communication network. In addition, the wireless communication network includes equipment operating in at least one of the control plane and the user plane. In some embodiments, the wireless communication network is a 5G communication network and can comprise a cellular network, a WiFi network, and/or a Bluetooth network.

The method 1100 includes, at 1112, the virtual anchor management node sending the client data to the client device. Further, the method 1100, at 1114, the client device receiving the client data from the virtual anchor management node over the premises communication network. In addition, the method 1100, at 1116, the client device accessing service information according to the client data from a device. Also, the method 1100 includes, at 1118, the client device sending the service information to the virtual anchor management (VAM) node over the premises communication network.

The method 1100 includes, at 1120, the virtual anchor management node selecting a first protocol stack according to the service information. Further, the method 1100 includes, at 1122, the virtual anchor management node sending the service information to a target network services node using the first protocol stack.

The method 1100 includes, at 1126, the virtual anchor management node selects a second protocol stack according to the client instructions. Further, the method 1100 includes, at 1128, the virtual anchor management node receiving client instructions using the second protocol stack from control device. In addition, the method 1100 includes, at 1130 the virtual anchor management node sending the client instructions to the client device over the premises communication network according to a unique identifier. The unique identifier can be identifier by an IP address referenced in the client instructions according to an IP address mapping-to-unique identifier mechanism described herein. Also, the method 1100 includes, at 1132, the client device receiving client instructions from the virtual anchor management node over the premises communication network. Further, the method 1100 includes, at 1134, the client device configuring itself (i.e. the client device) according to the client instructions.

Embodiments of the service multiplexer and the virtual anchor manager described herein can be combined in one device. Further, such a device can have functions of both a service multiplexer and a virtual anchor manager as described herein. In addition, persons of ordinary skill in the art are able to combine portions of embodiments or entire embodiments with other portions of embodiments or other entire embodiments in the present disclosure.

While for purposes of simplicity of explanation, the respective processes are shown and described as a series of blocks in FIGS. 10-11, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 12:
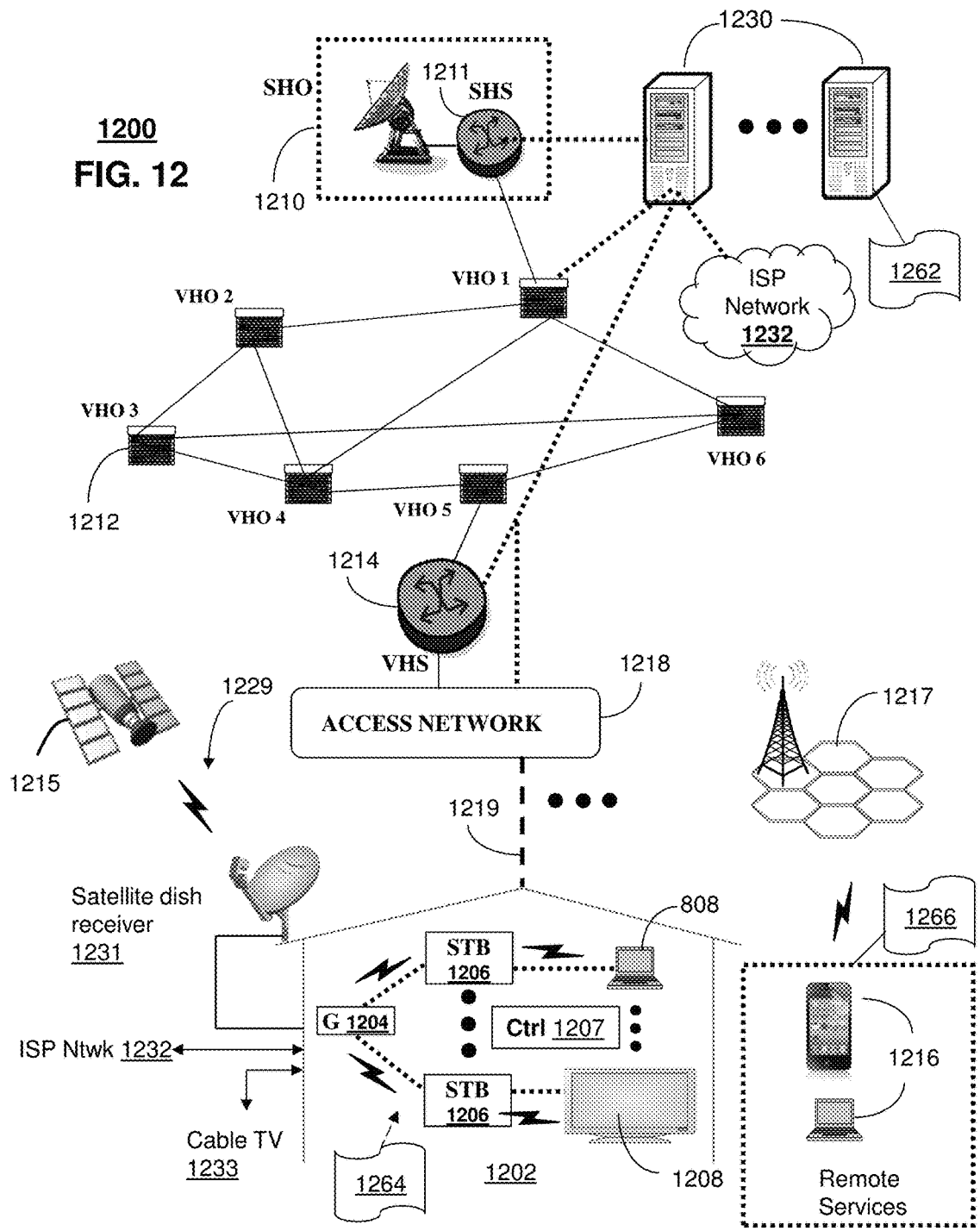
FIGS. 12-13 depict illustrative embodiments of communication systems that provide virtual anchor management services.

FIG. 12 depicts an illustrative embodiment of a communication system 1200 for providing various communication services, such as delivering media content. The communication system 1200 can represent an interactive media network, such as an interactive television system (e.g., an Internet Protocol Television (IPTV) media system). Communication system 1200 can be overlaid or operably coupled with systems 100, 200, 300, 400, 500, 600, 800, 900 of FIGS. 1-6 and 8-9 as another representative embodiment of communication system 1200. For instance, one or more devices illustrated in the communication system 1200 of FIG. 12 including a virtual anchor manager continuously connecting to a control plane of a wireless communication network. The wireless communication network includes equipment operating in at least one of the control plane and a user plane. Further, the virtual anchor manager can receive control information across the control plane indicating that client data to be received on the user plane of the wireless communication network for a client device. In addition, the virtual anchor manager can access a first protocol stack from a network node according to the control information. Also, the virtual anchor manager can receive the client data for the client device over the user plane using the first protocol stack. The client device includes a thin client function. The virtual anchor manager can provide the client data for the client device over a premises communication network.

In one or more embodiments, the communication system 1200 can include a super head-end office (SHO) 1210 with at least one super headend office server (SHS) 1211 which receives media content from satellite and/or terrestrial communication systems. In the present context, media content can represent, for example, audio content, moving image content such as 2D or 3D videos, video games, virtual reality content, still image content, and combinations thereof. The SHS server 1211 can forward packets associated with the media content to one or more video head-end servers (VHS) 1214 via a network of video head-end offices (VHO) 1212 according to a multicast communication protocol. The VHS 1214 can distribute multimedia broadcast content via an access network 1218 to commercial and/or residential buildings 1202 housing a gateway 1204 (such as a residential or commercial gateway).

The access network 1218 can represent a group of digital subscriber line access multiplexers (DSLAMs) located in a central office or a service area interface that provide broadband services over fiber optical links or copper twisted pairs 1219 to buildings 1202. The gateway 1204 can use communication technology to distribute broadcast signals to media processors 1206 such as Set-Top Boxes (STBs) which in turn present broadcast channels to media devices 1208 such as computers or television sets managed in some instances by a media controller 1207 (such as an infrared or RF remote controller).

The gateway 1204, the media processors 1206, and media devices 1208 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 1206 and subsystems of the IPTV media system for services such as video-on-demand (VoD), browsing an electronic programming guide (EPG), or other infrastructure services.

A satellite broadcast television system 1229 can be used in the media system of FIG. 12. The satellite broadcast television system can be overlaid, operably coupled with, or replace the IPTV system as another representative embodiment of communication system 1200. In this embodiment, signals transmitted by a satellite 1215 that include media content can be received by a satellite dish receiver 1231 coupled to the building 1202. Modulated signals received by the satellite dish receiver 1231 can be transferred to the media processors 1206 for demodulating, decoding, encoding, and/or distributing broadcast channels to the media devices 1208. The media processors 1206 can be equipped with a broadband port to an Internet Service Provider (ISP) network 1232 to enable interactive services such as VoD and EPG as described above.

In yet another embodiment, an analog or digital cable broadcast distribution system such as cable TV system 1233 can be overlaid, operably coupled with, or replace the IPTV system and/or the satellite TV system as another representative embodiment of communication system 1200. In this embodiment, the cable TV system 1233 can also provide Internet, telephony, and interactive media services. System 1200 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 1230, a portion of which can operate as a web server for providing web portal services over the ISP network 1232 to wireline media devices 808 or wireless communication devices 1216.

Communication system 1200 can also provide for all or a portion of the computing devices 1230 to function as a virtual anchor manager (herein referred to as virtual anchor manager 1230). The virtual anchor manager 1230 can use computing and communication technology to perform function 1262, which can include among other things, the techniques described by methods 1000 and 1100 of FIGS. 10-11. For instance, function 1262 of server 1230 can be similar to the functions described for virtual anchor managers 802, 902 of FIGS. 8-9 in accordance with methods 1000 and 1100. The media processors 1206 and wireless communication devices 1216 can be provisioned with software functions 1264 and 1266, respectively, to utilize the services of service multiplexer 1230. For instance, functions 1264 and 1266 of media processors 1206 and wireless communication devices 1216 can be similar to the functions described for the communication devices 106, 108, 110, 112, 114, 116, 204-224, 612, 614, and 616 of FIGS. 1-6 in accordance with method 700 and communication devices 806, 808, 810, 812, 814, 912, 914, and 916 of FIGS. 8-9 in accordance with methods 1000 and 1100.

Multiple forms of media services can be offered to media devices over landline technologies such as those described above. Additionally, media services can be offered to media devices by way of a wireless access base station 1217 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 13:
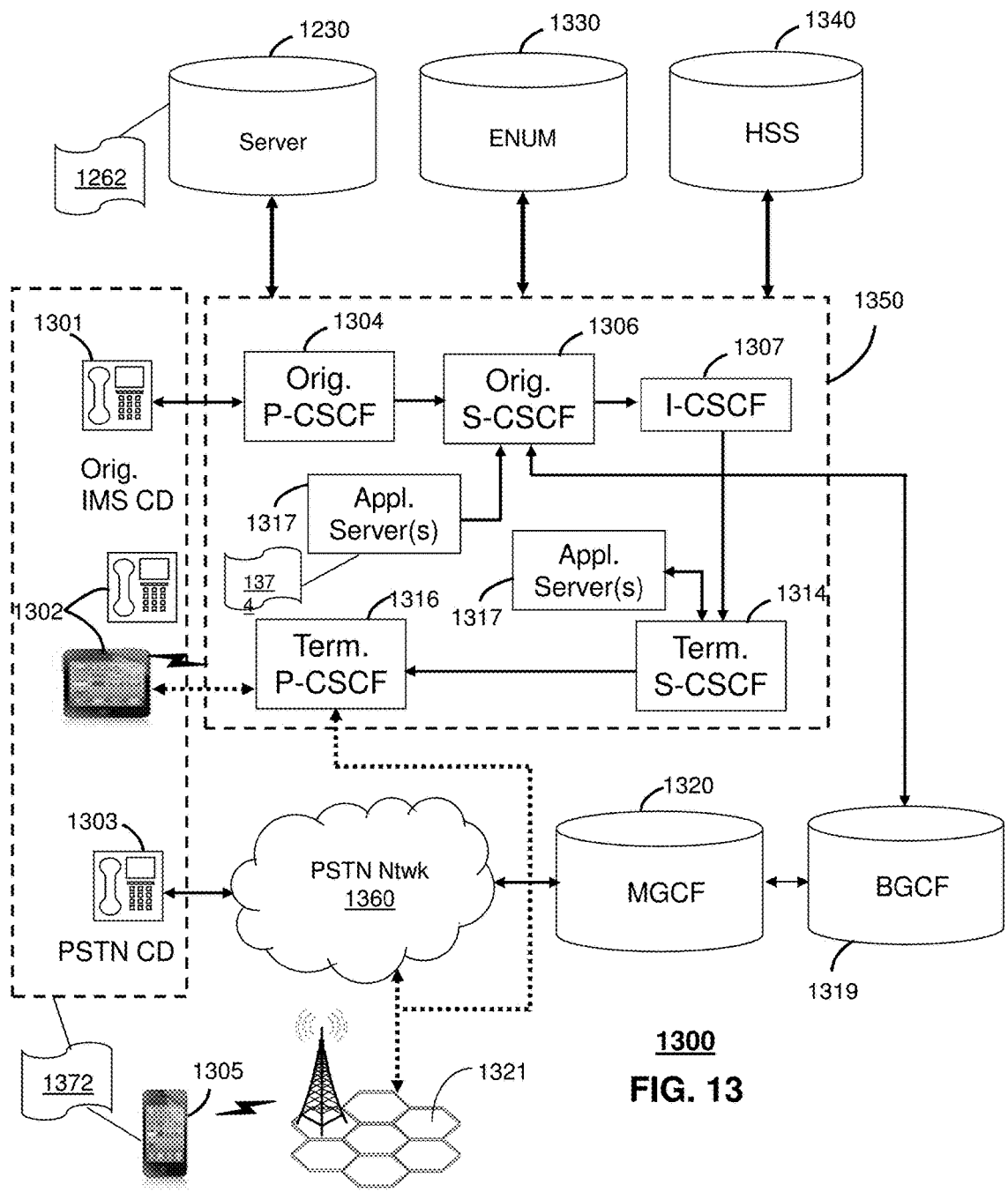

FIG. 13 depicts an illustrative embodiment of a communication system 1300 employing an IP Multimedia Subsystem (IMS) network architecture to facilitate the combined services of circuit-switched and packet-switched systems. Communication system 1300 can be overlaid or operably coupled with systems 100, 200, 300, 400, 500, and 600 of FIGS. 1-6. 800, 900 of FIGS. 8-9 and communication system 1200 as another representative embodiment of communication system 1300. Virtual anchor manager 830 can continuously connect to a control plane of a wireless communication network. The wireless communication network includes equipment operating in at least one of the control plane and a user plane. Further, the virtual anchor manager 830 can receive control information across the control plane indicating that client data to be received on the user plane of the wireless communication network for a client device. In addition, the virtual anchor manager 830 can access a first protocol stack from a network node according to the control information. Also, the virtual anchor manager 830 can receive the client data for the client device over the user plane using the first protocol stack. The client device includes a thin client function. The virtual anchor manager 830 can provide the client data for the client device over a premises communication network.

Communication system 1300 can comprise a Home Subscriber Server (HSS) 1340, a tElephone NUmber Mapping (ENUM) server 1330, and other network elements of an IMS network 1350. The IMS network 1350 can establish communications between IMS-compliant communication devices (CDs) 1301, 1302, Public Switched Telephone Network (PSTN) CDs 1303, 1305, and combinations thereof by way of a Media Gateway Control Function (MGCF) 1320 coupled to a PSTN network 1360. The MGCF 1320 need not be used when a communication session involves IMS CD to IMS CD communications. A communication session involving at least one PSTN CD may utilize the MGCF 1320.

IMS CDs 1301, 1302 can register with the IMS network 1350 by contacting a Proxy Call Session Control Function (P-CSCF) which communicates with an interrogating CSCF (I-CSCF), which in turn, communicates with a Serving CSCF (S-CSCF) to register the CDs with the HSS 1340. To initiate a communication session between CDs, an originating IMS CD 1301 can submit a Session Initiation Protocol (SIP INVITE) message to an originating P-CSCF 1304 which communicates with a corresponding originating S-CSCF 1306. The originating S-CSCF 1306 can submit the SIP INVITE message to one or more application servers (ASs) 1317 that can provide a variety of services to IMS subscribers.

For example, the application servers 1317 can be used to perform originating call feature treatment functions on the calling party number received by the originating S-CSCF 1306 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 1306 can submit queries to the ENUM system 1330 to translate an E.164 telephone number in the SIP INVITE message to a SIP Uniform Resource Identifier (URI) if the terminating communication device is IMS-compliant. The SIP URI can be used by an Interrogating CSCF (I-CSCF) 1307 to submit a query to the HSS 1340 to identify a terminating S-CSCF 1314 associated with a terminating IMS CD such as reference 1302. Once identified, the I-CSCF 1307 can submit the SIP INVITE message to the terminating S-CSCF 1314. The terminating S-CSCF 1314 can then identify a terminating P-CSCF 1316 associated with the terminating CD 1302. The P-CSCF 1316 may then signal the CD 1302 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 13 may be interchangeable. It is further noted that communication system 1300 can be adapted to support video conferencing. In addition, communication system 1300 can be adapted to provide the IMS CDs 1301, 1302 with the multimedia and Internet services of communication system 1200 of FIG. 12.

If the terminating communication device is instead a PSTN CD such as CD 1303 or CD 1305 (in instances where the cellular phone only supports circuit-switched voice communications), the ENUM system 1330 can respond with an unsuccessful address resolution which can cause the originating S-CSCF 1306 to forward the call to the MGCF 1320 via a Breakout Gateway Control Function (BGCF) 1319. The MGCF 1320 can then initiate the call to the terminating PSTN CD over the PSTN network 1360 to enable the calling and called parties to engage in voice and/or data communications.

It is further appreciated that the CDs of FIG. 13 can operate as wireline or wireless devices. For example, the CDs of FIG. 13 can be communicatively coupled to a cellular base station 1321, a femtocell, a WiFi router, a Digital Enhanced Cordless Telecommunications (DECT) base unit, or another suitable wireless access unit to establish communications with the IMS network 1350 of FIG. 13. The cellular access base station 1321 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 13.

Cellular phones supporting LTE can support packet-switched voice and packet-switched data communications and thus may operate as IMS-compliant mobile devices. In this embodiment, the cellular base station 1321 may communicate directly with the IMS network 1350 as shown by the arrow connecting the cellular base station 1321 and the P-CSCF 1316.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The virtual anchor manager 1230 of FIG. 12 can be operably coupled to communication system 1300 for purposes similar to those described above. Virtual anchor manager 1230 can perform function 1262 and thereby provide services to the CDs 1301, 1302, 1303 and 1305 of FIG. 13 similar to the functions described for virtual anchor manager of FIGS. 8-9 in accordance with methods 1000, 1100 of FIGS. 10-11. CDs 1301, 1302, 1303 and 1305, which can be adapted with software to perform function 1372 to utilize the services of the virtual anchor manager 1230 similar to the functions described for communication devices 806, 808, 810, 812, 814, 816, 912, 914, 916 of FIGS. 8-9 in accordance with methods 1000, 1100 of FIGS. 10-11. Virtual anchor manager 1230 can be an integral part of the application server(s) 1317 performing function 1374, which can be substantially similar to function 1262 and adapted to the operations of the IMS network 1350.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as 3rd Generation Partnership Project (3GPP). It is further noted that some or all embodiments of the subject disclosure may in whole or in part modify, supplement, or otherwise supersede final or proposed standards published and promulgated by 3GPP.

Figure 14:
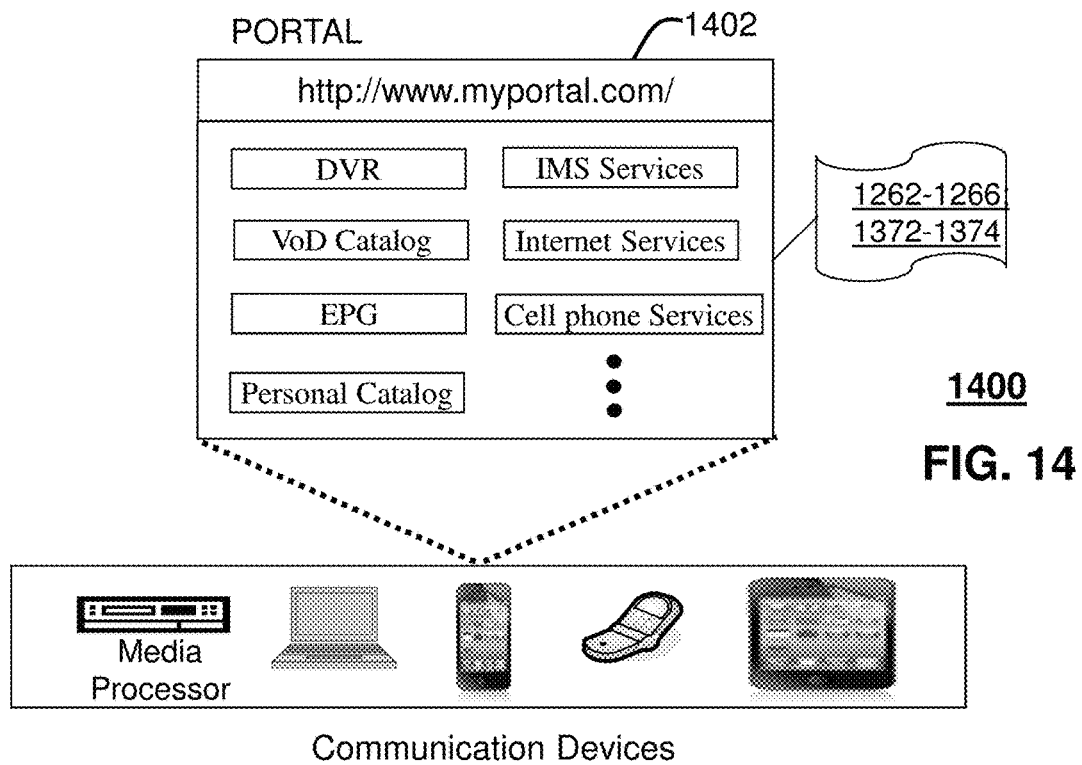
FIG. 14 depicts an illustrative embodiment of a web portal for interacting with the communication systems of systems that provide virtual anchor management services.

FIG. 14 depicts an illustrative embodiment of a web portal 1402 of a communication system 1400. Communication system 1400 can be overlaid or operably coupled with systems 100, 200, 300, 400, 500, and 600 of FIGS. 1-6, 806, 808, 810, 812, 814, 816 of FIGS. 8-9, communication system 1200, and/or communication system 1300 as another representative embodiment of systems 100, 200, 300, 400, 500, and 600 of FIGS. 1-6, 800, 900 of FIGS. 8-9, communication system 1200, and/or communication system 1300.

The web portal 1402 can be used for managing services of systems 100, 200, 300, 400, 500, 600 of FIGS. 1-6, 800, 900, of FIGS. 8-9, and communication systems 1200-1300. A web page of the web portal 1402 can be accessed by a Uniform Resource Locator (URL) with an Internet browser using an Internet-capable communication device such as those described in FIGS. 1-6, FIGS. 8-9, and FIGS. 10-11. The web portal 1402 can be configured, for example, to access a media processor 1206 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 1206. The web portal 1402 can also be used for provisioning IMS services described earlier, provisioning Internet services, provisioning cellular phone services, and so on.

The web portal 1402 can further be utilized to manage and provision software applications 1262-1266, and 1372-1374 to adapt these applications as may be desired by subscribers and/or service providers of systems 100, 200, 300, 400, 500, and 600 of FIGS. 1-6, 800, 900 of FIGS. 8-9, and communication systems 1200-1300. For instance, users of the services provided by server/service multiplexer 1230 can log into their on-line accounts and provision the server/service multiplexer 102, 202, 602, and 830 with configuring service portfolios, tailored applications dynamic grouping of sensors/IoT devices, and user configurable definable modules as describes in FIGS. 1-7, and so on. Further, users can configure virtual anchor managers 800, 900 with protocol stacks/client software for different services, configure an IP address-unique identifier mapping mechanism and service software to communicate with IoT devices. Service providers can log onto an administrator account to provision, monitor and/or maintain the systems 100, 200, 300, 400, 500, and 600 of FIGS. 1-6, 800, 900 of FIGS. 8-9, server/service multiplexer, or virtual anchor manager 830.

Figure 15:
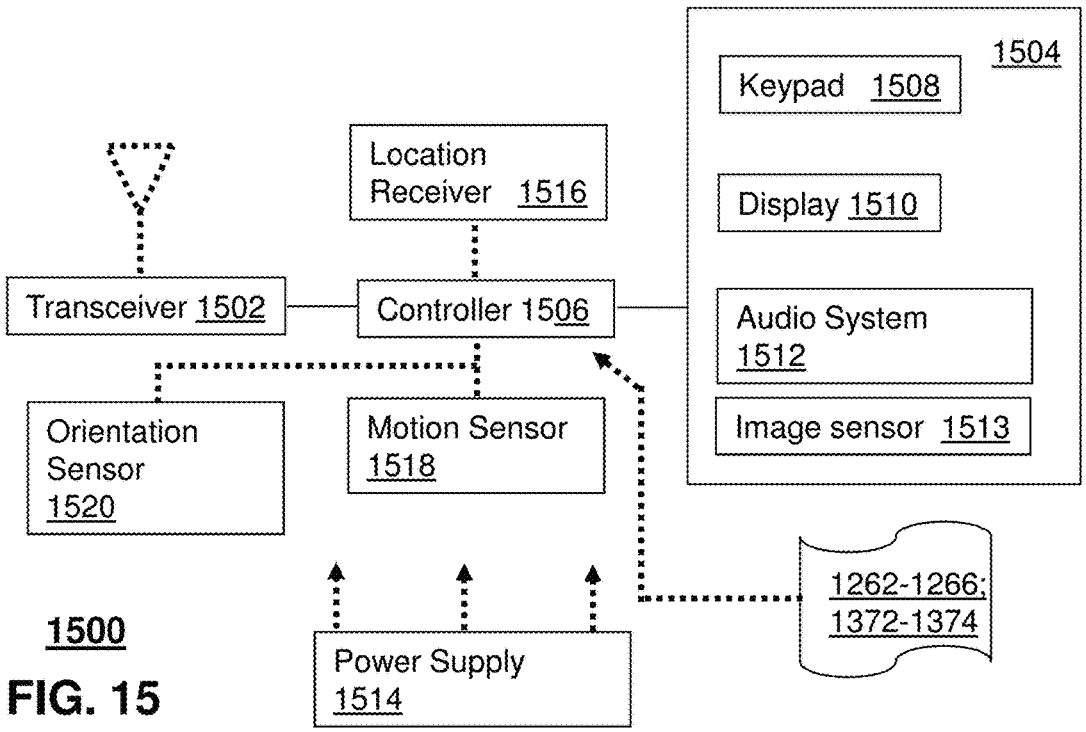
FIG. 15 depicts an illustrative embodiment of a communication device.

FIG. 15 depicts an illustrative embodiment of a communication device 1500. Communication device 1500 can serve in whole or in part as an illustrative embodiment of the devices depicted in FIGS. 1-6, 8-9 and 12-13 and can be configured to perform portions of methods 700, 1000, 1100 of FIGS. 7, 10, 11.

Communication device 1500 can comprise a wireline and/or wireless transceiver 1502 (herein transceiver 1502), a user interface (UI) 1504, a power supply 1514, a location receiver 1516, a motion sensor 1518, an orientation sensor 1520, and a controller 1506 for managing operations thereof. The transceiver 1502 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1λ, UMTS/HSDPA, GSM/GPRS, TDMA/EDGE, EV/DO, WiMAX, SDR, LTE, as well as other next generation wireless communication technologies as they arise. The transceiver 1502 can also be adapted to support circuit-switched wireline access technologies (such as PSTN), packet-switched wireline access technologies (such as TCP/IP, VoIP, etc.), and combinations thereof.

The UI 1504 can include a depressible or touch-sensitive keypad 1508 with a navigation mechanism such as a roller ball, a joystick, a mouse, or a navigation disk for manipulating operations of the communication device 1500. The keypad 1508 can be an integral part of a housing assembly of the communication device 1500 or an independent device operably coupled thereto by a tethered wireline interface (such as a USB cable) or a wireless interface supporting for example Bluetooth®. The keypad 1508 can represent a numeric keypad commonly used by phones, and/or a QWERTY keypad with alphanumeric keys. The UI 1504 can further include a display 1510 such as monochrome or color LCD (Liquid Crystal Display), OLED (Organic Light Emitting Diode) or other suitable display technology for conveying images to an end user of the communication device 1500. In an embodiment where the display 1510 is touch-sensitive, a portion or all of the keypad 1508 can be presented by way of the display 1510 with navigation features.

The display 1510 can use touch screen technology to also serve as a user interface for detecting user input. As a touch screen display, the communication device 1500 can be adapted to present a user interface with graphical user interface (GUI) elements that can be selected by a user with a touch of a finger. The touch screen display 1510 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 1510 can be an integral part of the housing assembly of the communication device 1500 or an independent device communicatively coupled thereto by a tethered wireline interface (such as a cable) or a wireless interface.

The UI 1504 can also include an audio system 1512 that utilizes audio technology for conveying low volume audio (such as audio heard in proximity of a human ear) and high volume audio (such as speakerphone for hands free operation). The audio system 1512 can further include a microphone for receiving audible signals of an end user. The audio system 1512 can also be used for voice recognition applications. The UI 1504 can further include an image sensor 1513 such as a charged coupled device (CCD) camera for capturing still or moving images.

The power supply 1514 can utilize common power management technologies such as replaceable and rechargeable batteries, supply regulation technologies, and/or charging system technologies for supplying energy to the components of the communication device 1500 to facilitate long-range or short-range portable applications. Alternatively, or in combination, the charging system can utilize external power sources such as DC power supplied over a physical interface such as a USB port or other suitable tethering technologies.

The location receiver 5116 can utilize location technology such as a global positioning system (GPS) receiver capable of assisted GPS for identifying a location of the communication device 1500 based on signals generated by a constellation of GPS satellites, which can be used for facilitating location services such as navigation. The motion sensor 1518 can utilize motion sensing technology such as an accelerometer, a gyroscope, or other suitable motion sensing technology to detect motion of the communication device 1500 in three-dimensional space. The orientation sensor 1520 can utilize orientation sensing technology such as a magnetometer to detect the orientation of the communication device 1500 (north, south, west, and east, as well as combined orientations in degrees, minutes, or other suitable orientation metrics).

The communication device 1500 can use the transceiver 1502 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 1506 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 1500.

Other components not shown in FIG. 15 can be used in one or more embodiments of the subject disclosure. For instance, the communication device 1500 can include a reset button (not shown). The reset button can be used to reset the controller 1506 of the communication device 1500. In yet another embodiment, the communication device 1500 can also include a factory default setting button positioned, for example, below a small hole in a housing assembly of the communication device 1500 to force the communication device 1500 to re-establish factory settings. In this embodiment, a user can use a protruding object such as a pen or paper clip tip to reach into the hole and depress the default setting button. The communication device 1500 can also include a slot for adding or removing an identity module such as a Subscriber Identity Module (SIM) card. SIM cards can be used for identifying subscriber services, executing programs, storing subscriber data, and so forth.

The communication device 1500 as described herein can operate with more or less of the circuit components shown in FIG. 15. These variant embodiments can be used in one or more embodiments of the subject disclosure.

The communication device 1500 can be adapted to perform the functions of devices of FIGS. 1-6, devices of FIGS. 8-9, the media processor 1206, the media devices 1208, or the portable communication devices 1216 of FIG. 12, as well as the IMS CDs 1301-1302 and PSTN CDs 1303-1305 of FIG. 13. It will be appreciated that the communication device 1500 can also represent other devices that can operate in systems 100, 200, 300, 400, 500, and 600 of FIGS. 1-6, 800, 900 of FIGS. 8-9, communication systems 1200-1300 of FIGS. 12-13 such as a gaming console and a media player. In addition, the controller 1506 can be adapted in various embodiments to perform the functions 1262-1266 and 1372-1374, respectively.

Upon reviewing the aforementioned embodiments, it would be evident to an artisan with ordinary skill in the art that said embodiments can be modified, reduced, or enhanced without departing from the scope of the claims described below. For example, a person of ordinary skill in the art would understand that embodiments described or portions thereof can be combined or separated, accordingly. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 16:
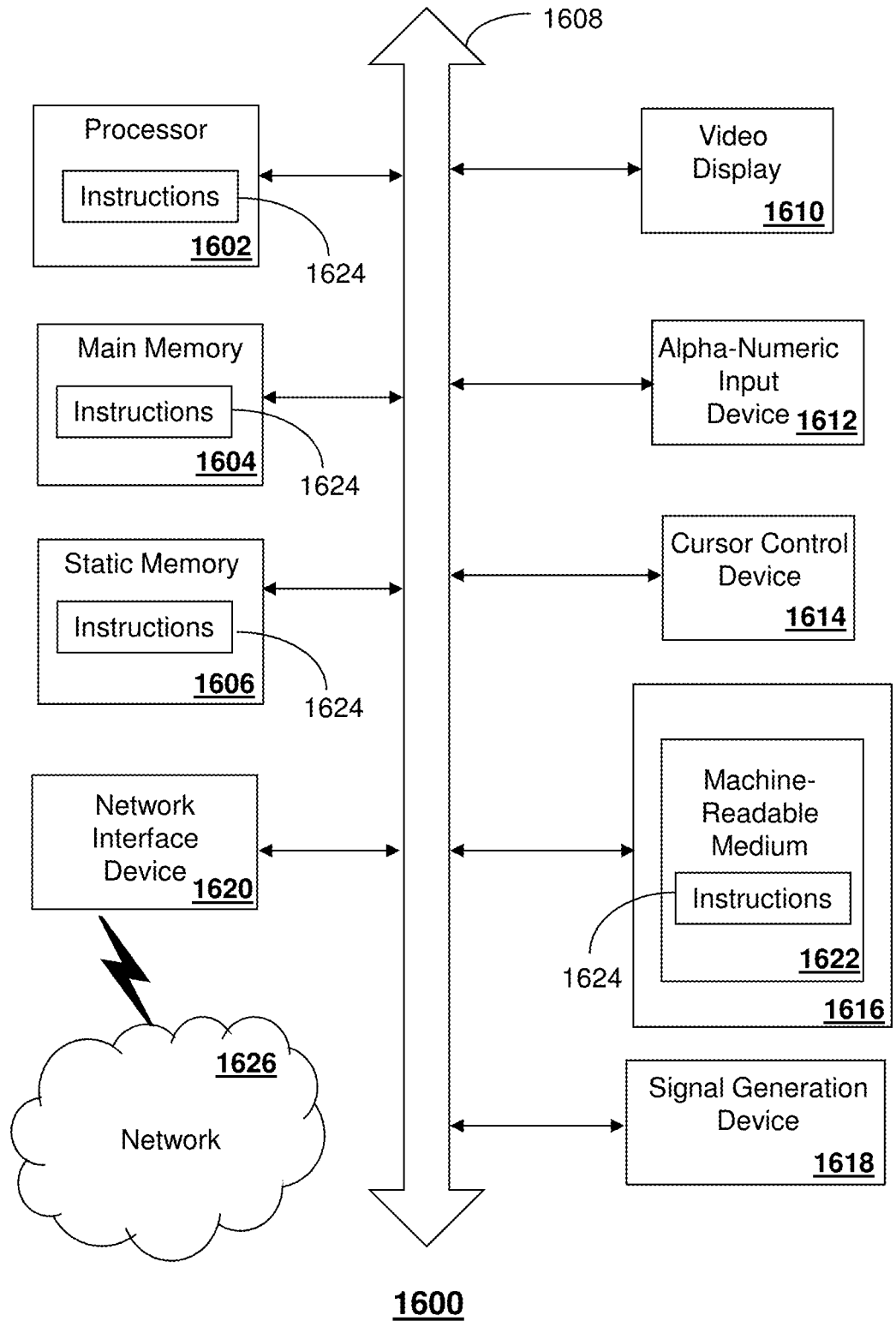
FIG. 16 is a diagrammatic representation of a machine in the form of a computer system within which a set of instructions, when executed, may cause the machine to perform any one or more of the methods described herein.

FIG. 16 depicts an exemplary diagrammatic representation of a machine in the form of a computer system 1600 within which a set of instructions, when executed, may cause the machine to perform any one or more of the methods described above. One or more instances of the machine can operate, for example, as the service multiplexer 1630, the media processor 1206, 106, 108, 110, 112, 114, 116, 204-224, 612, 614, and 616 and other devices of FIGS. 1-6 as well as 802, 806, 808, 810, 812, 814, 816, 902, 912, 914, 916. In some embodiments, the machine may be connected (e.g., using a network 1626) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1600 may include a processor (or controller) 1602 (e.g., a central processing unit (CPU)), a graphics processing unit (GPU, or both), a main memory 1604 and a static memory 1606, which communicate with each other via a bus 1608. The computer system 1600 may further include a display unit 1610 (e.g., a liquid crystal display (LCD), a flat panel, or a solid state display). The computer system 1600 may include an input device 1612 (e.g., a keyboard), a cursor control device 1614 (e.g., a mouse), a disk drive unit 1616, a signal generation device 1618 (e.g., a speaker or remote control) and a network interface device 1620. In distributed environments, the embodiments described in the subject disclosure can be adapted to utilize multiple display units 1610 controlled by two or more computer systems 1600. In this configuration, presentations described by the subject disclosure may in part be shown in a first of the display units 1610, while the remaining portion is presented in a second of the display units 1610.

The disk drive unit 1616 may include a tangible computer-readable storage medium 1622 on which is stored one or more sets of instructions (e.g., software 1624) embodying any one or more of the methods or functions described herein, including those methods illustrated above. The instructions 1624 may also reside, completely or at least partially, within the main memory 1604, the static memory 1606, and/or within the processor 1602 during execution thereof by the computer system 1600. The main memory 1604 and the processor 1602 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 1622 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee), and long-range communications (e.g., WiMAX, GSM, CDMA, LTE) can be used by computer system 1200. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device, comprising:
 a processing system including a processor; and
  a memory that stores executable instructions that, when executed by the processing system, facilitate performance of operations, the operations comprising:
   continuously connecting the device to a control plane of a wireless communication network, wherein the wireless communication network includes equipment operating in at least one of the control plane and a user plane;
   receiving control information across the control plane indicating that client data is to be received on the user plane from a network service node of a plurality of network service nodes of the wireless communication network for a client device;
   accessing a first protocol stack of a plurality of different protocol stacks via a network node according to the control information, wherein the plurality of different protocol stacks facilitate communications with the plurality of network service nodes;
   receiving the client data for the client device over the user plane using the first protocol stack of the plurality of different protocol stacks, wherein the client device includes a thin client function comprising a single protocol stack;
   providing the client data for the client device over a premises communication network via the single protocol stack of the thin client function; and
   sending the client device an awake signal, wherein in response to receiving the awake signal the client device is placed from an idle state to an active state allowing the client device to receive the client data, wherein idle state consumes a lower level of power than the active state.

2. The device of claim 1, wherein the operations further comprise obtaining an Internet Protocol (IP) address for the client device and wherein the receiving of the client data comprises receiving of the client data according to the IP address.

3. The device of claim 2, wherein the operations further comprise determining a unique identifier for the client device on the premises communication network according to the IP address.

4. The device of claim 1, wherein the operations further comprise:
 receiving services data from the client device using the single protocol stack of the thin client function;
 identifying a second protocol stack of the plurality of different protocol stacks and a target network services node of the plurality of network service nodes according to the services data; and
 sending the services data to the target network services node of the plurality of network service nodes using the second protocol stack of the plurality of different protocol stacks according to the services data.

5. The device of claim 1, wherein the operations further comprise:
 receiving client instructions from a control device, wherein the client instructions include an IP address for the client device; and
 sending the client instructions to client device in response to determining the client device according to the IP address.

6. The device of claim 1, wherein the wireless communication network comprises one of a cellular network, WiFi network, and Bluetooth network, and, wherein the premises communication network does not support Internet Protocol (IP).

7. A non-transitory, machine-readable storage medium, comprising executable instructions that, when executed by a processing system including a processor, facilitate performance of operations, the operations comprising:
 operating in an idle state, wherein the idle state consumes a lower level of power than an active state;
 transitioning from the idle state to the active state in response to receiving an awake signal from a virtual anchor management node over a premises communication network, wherein the virtual anchor management node obtains client data from a network service node of a plurality of network service nodes, wherein the client data is obtained over a wireless communication network that includes equipment operating in at least one of a control plane and a user plane, where the client data is obtained from the network service node of the plurality of network service nodes according to a first protocol stack of a plurality of different protocol stacks that facilitate communication with the plurality of network service nodes, and wherein the virtual anchor management node is continuously connecting to the control plane of the wireless communication network, wherein the wireless communication network includes equipment operating in at least one of the control plane and the user plane;

receiving the client data from the virtual anchor management node over the premises communication network according to a single protocol stack of a thin client function;

accessing service information according to the client data from a device; and sending the service information to the virtual anchor management node over the premises communication network according to the single protocol stack of the thin client function, wherein the transitioning from the idle state to the active state allows the processing system to receive the client data.

8. The non-transitory, machine-readable storage medium of claim 7, wherein the processing system further includes a thin client.

9. The non-transitory, machine-readable storage medium of claim 7, wherein the virtual anchor management node selects the first protocol stack of the plurality of different protocol stacks according to the service information, and wherein the virtual anchor management node sends the service information to a target network services node using the first protocol stack.

10. The non-transitory, machine-readable storage medium of claim 7, wherein the premises communication network does not support Internet Protocol (IP).

11. The non-transitory, machine-readable storage medium of claim 7, wherein the processing system is identified by a unique identifier on the premises communication network.

12. The non-transitory, machine-readable storage medium of claim 7, wherein the operations further comprise:

receiving client instructions from the virtual anchor management node over the premises communication network; and configuring a device according to the client instructions.

13. The non-transitory, machine-readable storage medium of claim 12, wherein the virtual anchor management node selects a second protocol stack according to the client instructions.

14. The non-transitory, machine-readable storage medium of claim 13, wherein the virtual anchor management node receives the client instructions from a control device using the second protocol stack.

15. A method, comprising:

continuously connecting, by a processing system including a processor of a device, the device to a control plane of a wireless communication network, wherein the wireless communication network includes equipment operating in at least one of the control plane and a user plane;

receiving, by the processing system, client instructions from a control device, wherein the client instructions include IP address for a client device;

identifying, by the processing system, a unique identifier for the client device according to the IP address;

sending, by the processing system, the client instructions to the client device according to the unique identifier;

sending, by the processing system, the client device an awake signal, wherein in response to receiving the awake signal the client device is placed from an idle state to an active state allowing the client device to receive the client instructions, wherein the idle state consumes a lower level of power than the active state;

receiving, by the processing system, control information across the control plane indicating that client data is to be received on the user plane of the wireless communication network for the client device;

accessing, by the processing system, a first protocol stack of a plurality of different protocol stacks via a network node according to the control information;

receiving, by the processing system, the client data for the client device over the user plane using the first protocol stack of the plurality of different protocol stacks, wherein the client device includes a thin client function comprising a single protocol stack; and providing, by the processing system, the client data for the client device over a premises communication network via the single protocol stack of the thin client function; and sending, by the processing system, the client device an awake signal, wherein in response to receiving the awake signal the client device is placed from an idle state to an active state allowing the client device to receive the client data, wherein idle state consumes a lower level of power than the active state.

16. The method of claim 15, further comprising obtaining, by the processing system, an Internet Protocol (IP) address for the client device and wherein the receiving of the client data comprises receiving of the client data according to the IP address.

17. The method of claim 16, further comprising determining, by the processing system, the unique identifier for the client device on the premises communication network according to the IP address.

18. The method of claim 15, wherein the premises communication network does not support Internet Protocol (IP).

19. The method of claim 15, wherein the wireless communication network comprises one of a cellular network, WiFi network, and Bluetooth network, and, wherein the premises communication network does not support Internet Protocol (IP).

20. The method of claim 15, the operations further comprising:

receiving, by the processing system, client instructions from a control device, wherein the client instructions include an IP address for the client device; and sending, by the processing system, the client instructions to client device in response to determining the client device according to the IP address.

* * * * *